(12) United States Patent
Chiba et al.

(10) Patent No.: US 7,282,157 B2
(45) Date of Patent: Oct. 16, 2007

(54) METHOD OF MANUFACTURING LIGHT-PROPAGATING PROBE FOR NEAR-FIELD MICROSCOPE

(75) Inventors: Norio Chiba, Chiba (JP); Hiroshi Muramatsu, Chiba (JP); Masato Iyoki, Chiba (JP)

(73) Assignee: SII NanoTechnology Inc. (JP)

( * ) Notice: Subject to any disclaimer, the term of this patent is extended or adjusted under 35 U.S.C. 154(b) by 499 days.

(21) Appl. No.: 10/692,345

(22) Filed: Oct. 23, 2003

(65) Prior Publication Data

US 2004/0126073 A1 Jul. 1, 2004

(30) Foreign Application Priority Data

Nov. 11, 2002 (JP) ............................. 2002-326709

(51) Int. Cl.
  B29D 11/00   (2006.01)
  B44C 1/22    (2006.01)
  C25F 3/00    (2006.01)
  C23F 1/00    (2006.01)
  C03C 15/00   (2006.01)

(52) U.S. Cl. ............................. 216/24; 216/11; 216/97

(58) Field of Classification Search ................ 216/11, 216/24, 41, 97; 385/12; 250/306
See application file for complete search history.

(56) References Cited

U.S. PATENT DOCUMENTS

| 3,982,943 A | * | 9/1976 | Feng et al. ................ 430/312 |
| 6,388,239 B1 | * | 5/2002 | Muramatsu ............. 250/201.3 |
| 2002/0054285 A1 | * | 5/2002 | Todo et al. ............... 356/73.1 |

FOREIGN PATENT DOCUMENTS

| JP | 11271338 A | * | 10/1999 |
| JP | 2002162332 A | * | 6/2002 |

* cited by examiner

*Primary Examiner*—Parviz Hassanzadeh
*Assistant Examiner*—Roberts Culbert
(74) *Attorney, Agent, or Firm*—Adams & Wilks

(57) ABSTRACT

A manufacturing method for a light propagating probe comprises a step of sharpening a light-propagating body having a sharpened section formed on an optical fiber, a step of forming the light-propagating body into a hook shape close to the sharpened section, a metal film coating step for forming a transparent opening section in a tip section, a step of protecting the transparent opening section with a resist material, a step of forming a reflecting surface for a light lever method, a step for metal film coating a spring operating part to the rear from the hook-shaped section, and a step of removing the resist material protecting the transparent opening section.

52 Claims, 12 Drawing Sheets

US 7,282,157 B2

METHOD OF MANUFACTURING LIGHT-PROPAGATING PROBE FOR NEAR-FIELD MICROSCOPE

BACKGROUND OF THE INVENTION

1. Field of the Invention

The present invention relates to a manufacturing method for a light-propagating probe using a near-field microscope for measuring optical characteristics in a microscopic region of a material to be measured, as one type of probe microscope.

2. Description of the Related Art

Scanning probe microscopes, exemplified by Atomic Force Microscopes (AFM) and Scanning Tunnel Microscopes (STM) are widely adopted because they are capable of observing microscopic shapes on sample surfaces. However, conventional AFMs and STMs are suitable for high resolution shape observation of a sample surface, but can not measure the physical or chemical properties of a sample. Near field light is now being used as means for observing these type of sample properties.

For example, there have been efforts to measure optical characteristics and shape of a sample by bringing a probe made of an optical medium having a sharpened tip to within less than the light wavelength of the measurement sample, and a number of near-field microscopes have been proposed. As one of these devices, there has been proposed a device for observing surface shape by irradiating laser light from a sample surface so as to irradiate the entire rear surface of the sample, detecting evanescent light leaking to the sample surface by bringing a tip of a light fiber probe having a jogging mechanism, and measuring variations in strength of the evanescent light by scanning the probe so as to detect constant evanescent light or scanning the probe horizontally.

There has also been proposed a device for causing a tip of an optical fiber probe held vertically with respect to the sample to vibrate horizontally with respect to the sample surface, detecting variations in amplitude of vibrations caused by friction between the sample surface and the probe tip as displacement of the optical axis of laser light that is irradiated from the optical fiber tip and passes through the sample, and holding a distance between a probe tip and the sample surface constant by moving the sample using a jogging mechanism, to detect surface shape from the strength of signals input to a jogging mechanism, and measure optical permeability of a sample.

An optical fiber probe used in these near-field microscopes is a straight type, and various aspects and manufacturing methods for a straight optical probe are disclosed (for example, refer to patent document 1). One example is shown in FIG. 18. A tip section of an optical fiber comprised of a core 201 and clad 202 stretches from the outer periphery of the clad 202 to the center of the core 201, and is sharpened to a cone shape. There is a shaded cover layer 204 on the surface of an acute section 203, and an opening section (aperture) 205 at the tip of the acute section 203.

On the other hand, there has also been proposed a scanning near-field atomic force microscope for irradiating laser light from a tip of an optical fiber probe to a sample to detect the surface shape and measure optical characteristics of the sample, at the same time as functioning as an AFM, using a hook-shaped optical fiber probe as an AFM cantilever (for example, refer to patent document 2).

Patent document 1
International patent laid-open No. WO95/33207 (page 16-17, FIG. 4).

Patent document 2
Japanese patent laid-open No. Hei. 7-164542 (FIG. 18).

Among near-field microscopes using the straight optical fiber probe shown in FIG. 18, in the case of devices that perform distance control between a probe tip and the sample surface using evanescent light, since light intensity is used as sample height direction information there is the drawback that it is not possible to separate light intensity variations in the height direction of the sample and light intensity variations due to light absorption of the sample, and it is difficult to use such near-field microscopes as means for measuring physical and chemical properties of a sample. Also, in the case where there is severe unevenness on the sample surface, light may sometimes not be totally reflected at the sample surface, and this passing light causes interference at the sample surface and may hinder measurement.

In the case where the probe is made to vibrate horizontally, since the probe tip vibrates sideways, and particularly in cases such as when there is severe unevenness of the sample surface, there are limitations to improvement of resolution in the sideways direction.

On the other hand, it can be considered that in the case of a scanning near-field microscope using a hook-shaped optical fiber probe as an AFM cantilever, it is possible to observe measurements of surface shape and optical characteristics of a sample at high resolution, regardless of the presence or absence of light permeability or conductivity of the sample.

Here, since the straight optical fiber probe shown in FIG. 18 is straight, it is possible to form the acute section 203 comparatively easily. Also, formation of the shaded cover 204 and the opening section 205 is possible using one-time deposition using a rotating deposition jig. On the other hand, a hook-shaped optical fiber probe used in a scanning near-field atomic force microscope requires, in addition to advanced shaping technology for the hook shape, a lot of processes compared to a straight probe, such as forming the shaded cover for the hook-shaped formation, forming an opening, forming a reflecting surface to cause AFM operation, etc. Therefore, the manufacturing process becomes complicated, it is difficult to maintain reproducibility, and it is difficult to lower manufacturing cost.

SUMMARY OF THE INVENTION

The object of the present invention is to implement a method of manufacturing a probe for a near-field microscope that has high efficiency, is simple to manufacture, and has good shape reproducibility.

A method of manufacturing a light-propagating probe for a near-field microscope, of the present invention, is for a probe made from a light-propagating body having a transparent opening for passing light at an end section and a metal film coating at a tip section other than at the transparent opening, the transparent opening being formed so as to give a pointed tip section, having a hook-shaped close to the tip section and functioning as a cantilever having resilience capable of being displaced in a direction perpendicular to a sample surface, and having a reflecting surface for carrying out optical position detection of the tip section at an opposite side to the tip section with respect to the hook-shaped section comprising a step of sharpening the light-propagating probe body, a step of forming the light-propagating probe body in a hook-shaped, a step of forming the reflecting surface, a metal film coating step for forming the transparent opening section, a step of protecting the transparent opening section with a resist material, and a step of removing the resist material.

With this manufacturing method, it becomes possible to easily manufacture a high efficiency hook-shaped light-propagating probe, with good reproducibility.

Also, a manufacturing process for a light-propagating probe for a near-field microscope of the present invention executes primary processes in the order of a step of sharpening the light-propagating probe body, a step of forming the light-propagating probe body in a hook-shaped, a coating step for forming metal film on the transparent opening section, a step of protecting the transparent opening section with a resist material, a step of forming the reflecting surface, a step for metal film coating a spring operating part rearwards from the hook-shaped section, and a step of removing the resist material.

If this manufacturing method is used, foreign matter is attached to the transparent opening in order to directly protect the formed transparent opening, it is possible to prevent the transparent section from being damaged, and it is also possible to form the reflecting surface after the film formation to form the transparent opening, which means that it is possible to prevent increase in surface roughness of the surface of the reflecting surface using a cover film attached on the reflecting surface.

Also, a process for forming the reflecting surface can be carried out before a process for protecting the transparent opening with a resist material. It is also possible for the process for forming the reflecting surface to be carried out before a metal film coating process for forming the transparent opening.

A step of sharpening the light-propagating probe body includes a procedure for applying tension to the light-propagating probe using a pair of spring mechanisms, irradiating carbon dioxide gas laser light by focusing with a lens, and locally heating the light-propagating probe to cause tension fractures. This step is carried out by adjusting the output of the carbon dioxide gas laser while observing with a camera device. After that, the tip section is reshaped using wet chemical etching.

At this time, the pair of spring mechanisms are spring mechanisms capable of independent adjustment of respective spring constants or initial tension, and there is also a procedure for independently adjusting respective spring constants or initial tension.

The lens for focusing the carbon dioxide gas laser light can be a cylindrical lens or a spherical lens made of, for example, zinc selenium (ZnSe). At this time, it is easier to adjust the height of the light-propagating body with respect to the optical axis if a cylindrical lens is used. The light-propagating body is adjusted to be arranged at the focal point position of the focusing lens, or in front of or behind the focal point position.

The carbon dioxide gas laser light is irradiated at a comparatively small output such that the light-propagating body displays slight stretching until the light-propagating body stretches a specified amount, and then output is increased to cause fracture. This output increase can be at a fixed rate.

The wet chemical etching includes a step of immersing the light-propagating body that has been subjected to tensile fracture in an etching fluid mainly comprising hydrofluoric acid to further sharpen the tip section. At this time, it is possible to use, as the etching fluid, an etching method comprising a first solution layer mainly comprising this hydrofluoric acid, and a second solution layer having a lower specific gravity than the first solution layer, and not reacting or mixing with the first solution layer. However, if this two layer etching method is used, if the light-propagating body is washed using an organic solvent that dissolves the material constituting the second solution layer and is water soluble, more effective cleaning is enabled.

It is also possible to carry out etching that is more stable if temperature control is performed so that the etching fluid is at a constant temperature.

According to these light-propagating body sharpening processes, it is possible to form a high precision tip section with good reproducibility.

A separate step for sharpening the light-propagating body includes a procedure of immersing the light-propagating body in an etching fluid that comprises a first solution layer mainly comprising hydrofluoric acid, and a second solution layer having a lower specific gravity than the first solution layer, and not reacting or mixing with the first solution layer. This etching solution is temperature controlled to a fixed temperature. Etching also takes place on a vibration isolation table. However, if this two layer etching method is used, if the light-propagating body is washed using an organic solvent that dissolves the material constituting the second solution layer and is water soluble, more effective cleaning is enabled.

According to these light-propagating body sharpening processes, it is possible to form a high precision tip section with good reproducibility simply by etching.

Also, the step of sharpening the light-propagating body includes a step of testing for presence or absence of long cylindrical cavity defects within the light-propagating body. This testing step can be carried out using a procedure for arranging the light-propagating body between two light-transparent glass plates, filling between the two glass plates with a transparent medium having the same refractive index as the refractive index of the light-propagating body, and then observing the light-propagating body using an optical microscope. The microscope observation preferably uses dark field observation.

According to this sharpening step containing a fault evaluation step, it is possible to prevent sharpening formation defects caused by faults, and it is possible to improve yield.

The step for making the light-propagating body hook-shaped is a step of irradiating carbon dioxide gas laser light to a desired position close to a tip section of the sharpened light-propagating body. The step of forming this light-propagating body in a hook-shape can enable manufacture of a hook shape with better shape reproducibility by determining the bend angle of the hook shape through simultaneous observation using a camera, to control irradiation of carbon dioxide gas laser light.

The step of forming the reflecting surface has a step of sharpening the light-propagating body, a step of forming the light-propagating body in a hook shape, and a step of mechanically polishing the hook-shaped section of the light-propagating body sharpened and formed in a hook shape that is opposite to the tip section by pressing against a rotating polishing plate, the pressing being carried out utilizing resilience of the light-propagating body itself. This step of mechanically polishing the light-propagating body can be carried out using a procedure of causing the light-propagating body to project a specified length and fixing to a polishing stage at a first angle with respect to a surface of the polishing plate, bringing the polishing stage and the polishing plate relatively close to each other, causing a part of the light-propagating body to be polished into contact with the polishing plate, bringing the polishing stage and the polishing plate closer together relatively, and holding the part of the light-propagating body to be polished at a second angle with respect to the surface of the polishing plate. At this time, preferably, the specified length that the light-propagating body is made to project is in the range 5 mm to 50 mm, the first angle is in a range of 2 degrees to 60 degrees, and the second angle is 0 degrees or more, and less than the first angle.

With this reflecting surface formation step, it is possible to easily form a reflecting surface having good positional precision, angular precision and shape reproducibility.

The wet chemical etching can be carried out after tension fracture of the light-propagating body by irradiation of carbon dioxide gas laser light, before the step of making the light-propagating body hook-shaped. It is also possible to carry out the wet chemical etching after the step of making the light-propagating body hook-shaped.

The metal film coating step for forming the transparent opening is a vacuum deposition step using a rotating deposition jig to carry out deposition while rotating the light-propagating body, the rotating deposition jig having a structure where the light-propagating body is held so that the jig rotational axis becomes the same as or parallel to the center axis of the tip section of the light-propagating body that has been sharpened and formed into a hook shape. This vacuum deposition step can also be carried out in two stages. At this time, between the first vacuum deposition and the secnd vacuum deposition, the vacuum chamber is opened to the atmosphere once, or exhaust of the vaccum is stopped and oxygen gas is introduced until a desired pressure is reached, and then the chamber is left for a fixed time.

According to this metal film formation step, it is possible to cover a smooth shaded film having fewer faults attributable to optical background, and it is possible to produce a transparent opening having good reproducibility.

The step for metal film coating the spring operating part rearwards from the hook-shaped section is a vacuum deposition step using a rotating deposition jig to carry out deposition while rotating the light-propagating body, the rotating deposition jig having a structure where the light-propagating body is held so that the jig rotational axis becomes the same as or parallel to the center axis of the spring operating part rearward from the hook-shaped section.

Also, another step for metal film coating the spring operating part rearwards from the hook-shaped section is a step of forming a metal film by vacuum deposition or sputtering from at least two directions around the center axis of the spring operating part rearwards from the hook-shaped section, a light-propagating body fixing jig for film formation being constructed so as to easily enable rotation around the center axis of the spring operating part rearwards from the hook-shaped section.

According to these metal film coating steps, it is possible to easily form a metal film coating on the spring operating parts. In these vacuum deposition steps, a rotation rate for the rotating deposition jig is preferably in a range from 30 times per second to 1,000 times per second. Here, the spring operating parts means parts have elasticity.

As the material of the metal film coating, it is possible to use the any of aluminum, aluminum silicon alloy, gold or silver, or a two layers construction of any of silver/gold, chrome/gold, aluminum/gold, aluminum silicon alloy/gold. Also, an aluminum silicon alloy preferably has a silicon component in a weight ratio of 0.5% to 2%.

The film thickness of the metal film coating is selected from 30 nm to 1,000 nm. Also, film formation rate is elected at 5 nm per second or faster, but it is possible to obtain smoother metal film coating in a range of 10 nm to 100 nm per second.

The step of protecting the transparent opening with a resist material includes a procedure for dripping trace amounts of the resist material onto a flat plate, and inserting the transparent opening from 5 im to 200 im into a section of the resist material that is raised up by its own surface tension using a precision stage. By protecting the transparent opening with a resist material, in the step of metal film coating the spring operating parts rearwards from the hook-shaped section, it is possible to prevent accumulation of the metal film in the transparent opening and it is possible to protect the tip section from physical fracture.

With this step, it is possible to reliably cover a transparent opening without damaging the transparent opening. Reliability of this step is improved if it is carried out while observing the probe tip section using a microscope.

The resist material is preferably a resin material mainly composed of any of butyl acetate, ethyl acetate, or nitrocellulose. At this time, removal of the resist material is effectively carried out by ultrasonic cleaning using a cleaning solvent mainly composed of N-methyl-2-pyrrolidone.

In these series of processes for a procedure for manufacturing a light-propagating probe for a near-field microscope, there is included an procedure for removing trace amounts of foreign matter that have become attached to the light-propagating body surface by ultrasonic cleaning using a cleaning solvent mainly composed of N-methyl-2-pyrrolidone. Also, handling of the light-propagating body is carried out under an environment using anti-static means. As the antistatic means, it is possible to use any all of an ionizer, an antistatic sheet, a metal case for light-propagating body storage, or humidity control.

Using this cleaning and antistatic means, it is possible to prevent defects in the metal film coating caused by impurities, and it is possible to manufacture a high precision light-propagating probe that has high resolution and little background light caused by leaked light.

BRIEF DESCRIPTION OF THE DRAWINGS

FIG. 9 is a schematic diagram of the constricted appearance of an optical fiber manufactured by the present invention.

FIG. 12 is a schematic drawing showing the process of sharpening using chemical etching.

DESCRIPTION OF THE PREFERRED EMBODIMENTS

Embodiments of the present invention will be described in the following with reference to the drawings.

Figure 1:
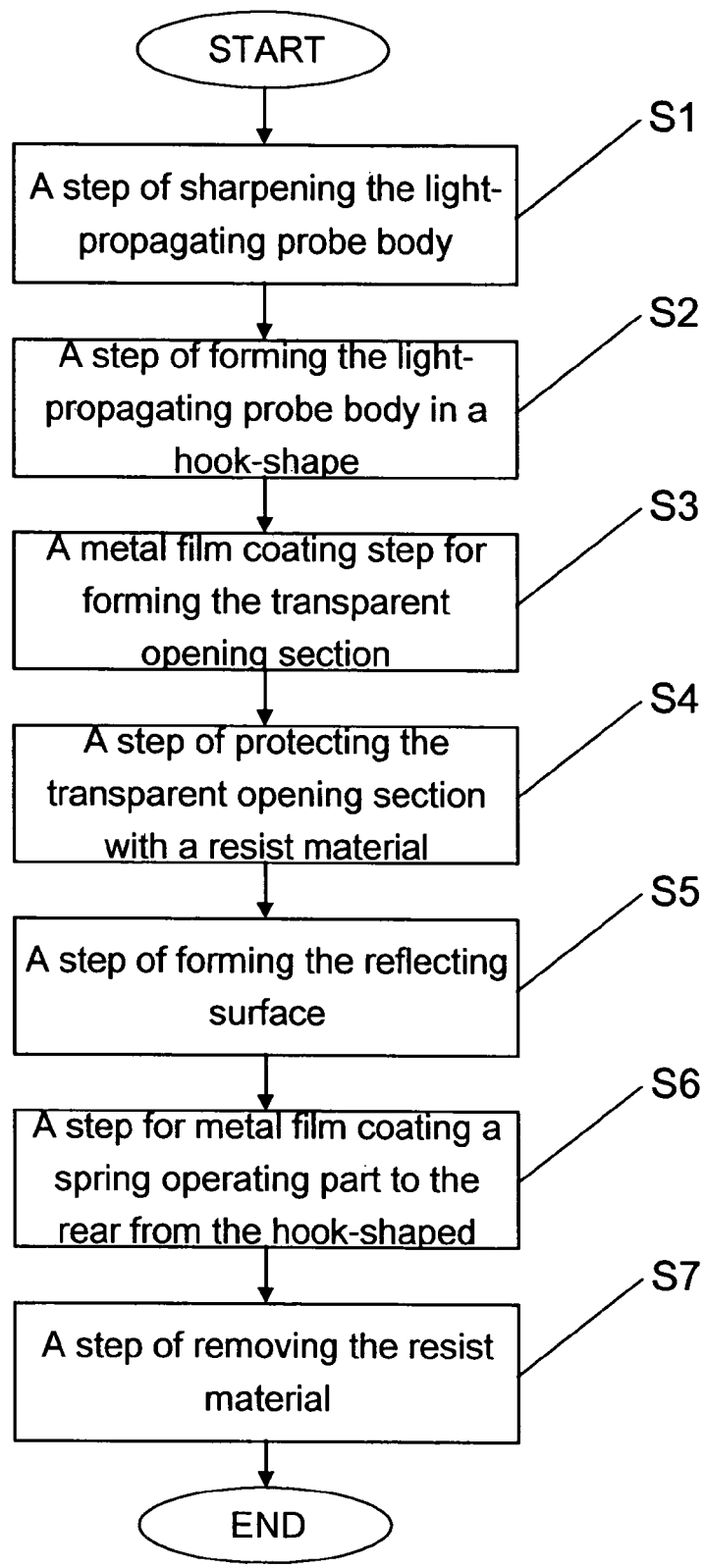
FIG. 1 is a flowchart for a manufacturing method of a light-propagating probe for a near-field microscope of a first embodiment of the present invention.
Figure 2:
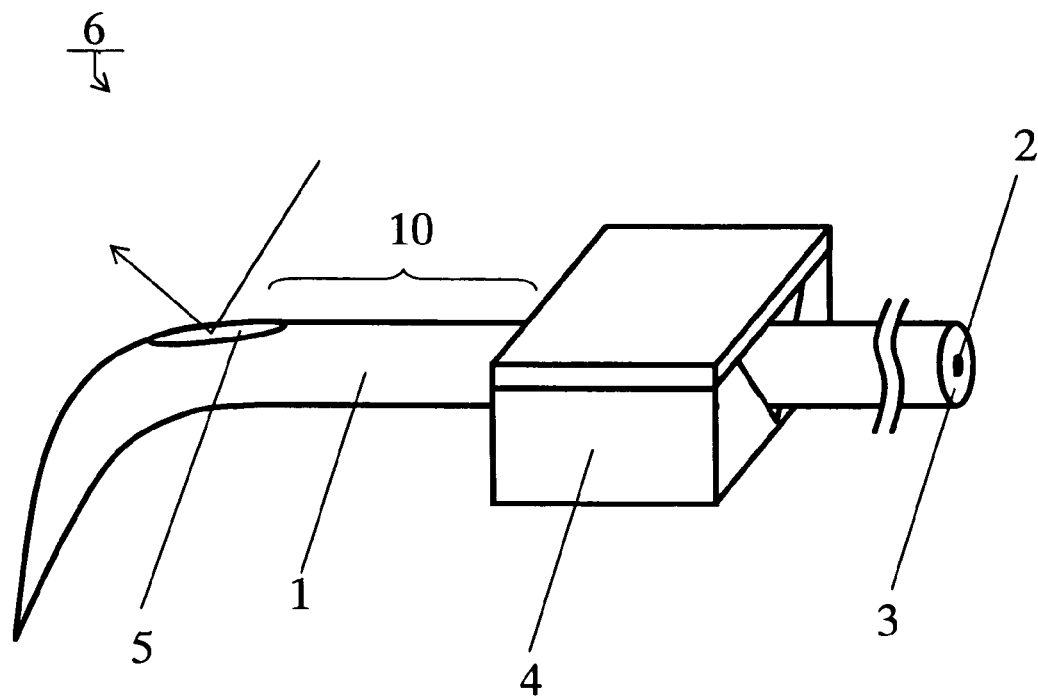
FIG. 2 is a perspective view showing the structure of a probe for a near-field microscope manufactured using the manufacturing method for a light-propagating probe for a near-field microscope of the present invention.
Figure 3:
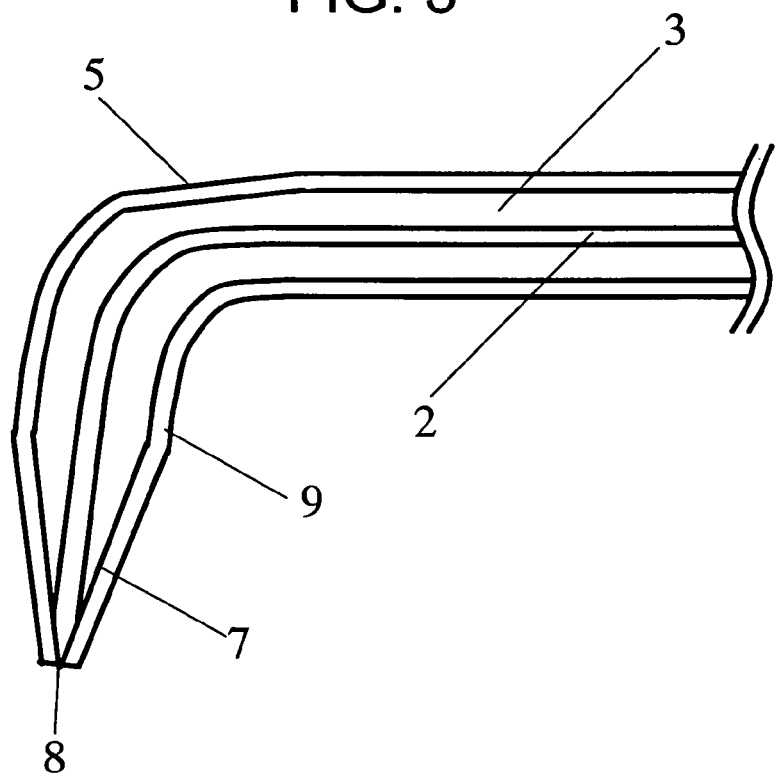
FIG. 3 is a cross sectional side view of a light-propagating probe for a near-field microscope.

A flowchart for a manufacturing method of a light-propagating probe for a near-field microscope of a first embodiment of the present invention is shown in FIG. 1. Also, FIG. 2 is a perspective view showing the structure of a probe for a near-field microscope manufactured using the manufacturing method for a light-propagating probe for a near-field microscope of the present invention, and FIG. 3 is a cross sectional side view of a light-propagating probe for a near-field microscope. The light-propagating probe 6 is formed using an optical fiber 1 comprising a core 2 for passing light, and a clad 3 having a different refractive index from that of the core 2. The optical fiber 1 is sharpened, and formed into a hook shape. A reflecting surface 5, for detecting displacement of the tip section of the light-propagating probe 6 due to the resilience of a resilient spring section constituting a spring operating part 10 by an optical lever method used in an AFM device, is formed at a rear section of the hook-shaped section. A probe fixing body 4 is arranged behind the spring operating part 10. The tip section of the optical fiber probe 1 has a pointed tip section 7 that is sharpened, and is covered by a metal film coating 9 except at the tip end thereof to form a transparent opening 8.

The manufacturing method for a light-propagating probe shown in FIG. 1 comprises a step S1 of sharpening the light-propagating body forming the sharp section 7 on the optical fiber 1, a step S2 of forming the light-propagating body into a hook-shaped to form a hook shape close to the sharp section 7, a metal film coating step S3 for forming the transparent opening section on the tip section 7, a step S4 of protecting the transparent opening 8 with a resist material, a step S5 of forming the reflecting surface 5 for a light lever method, a step S6 for metal film coating a spring operating part 10 to the rear from the hook-shaped section, and a step S7 of removing the resist material protecting the transparent opening 8, carried out in the order shown in FIG. 1.

According to this light propagating probe manufacturing method, it is possible to easily manufacture a high efficiency hook-shaped light-propagating probe 6 easily with good reproducibility. Also, because the formed transparent opening is directly protected, it is possible to prevent foreign matter becoming attached and the transparent opening being damaged in subsequent manufacturing processes, and because the reflecting surface forming step S5 is carried out after the metal film coating step S3 for forming the transparent surface S5, it is possible to prevent increase in surface roughness of the reflecting surface due to an insulation film attached to the reflecting surface in the step S5 of forming the reflecting layer.

Figure 4:
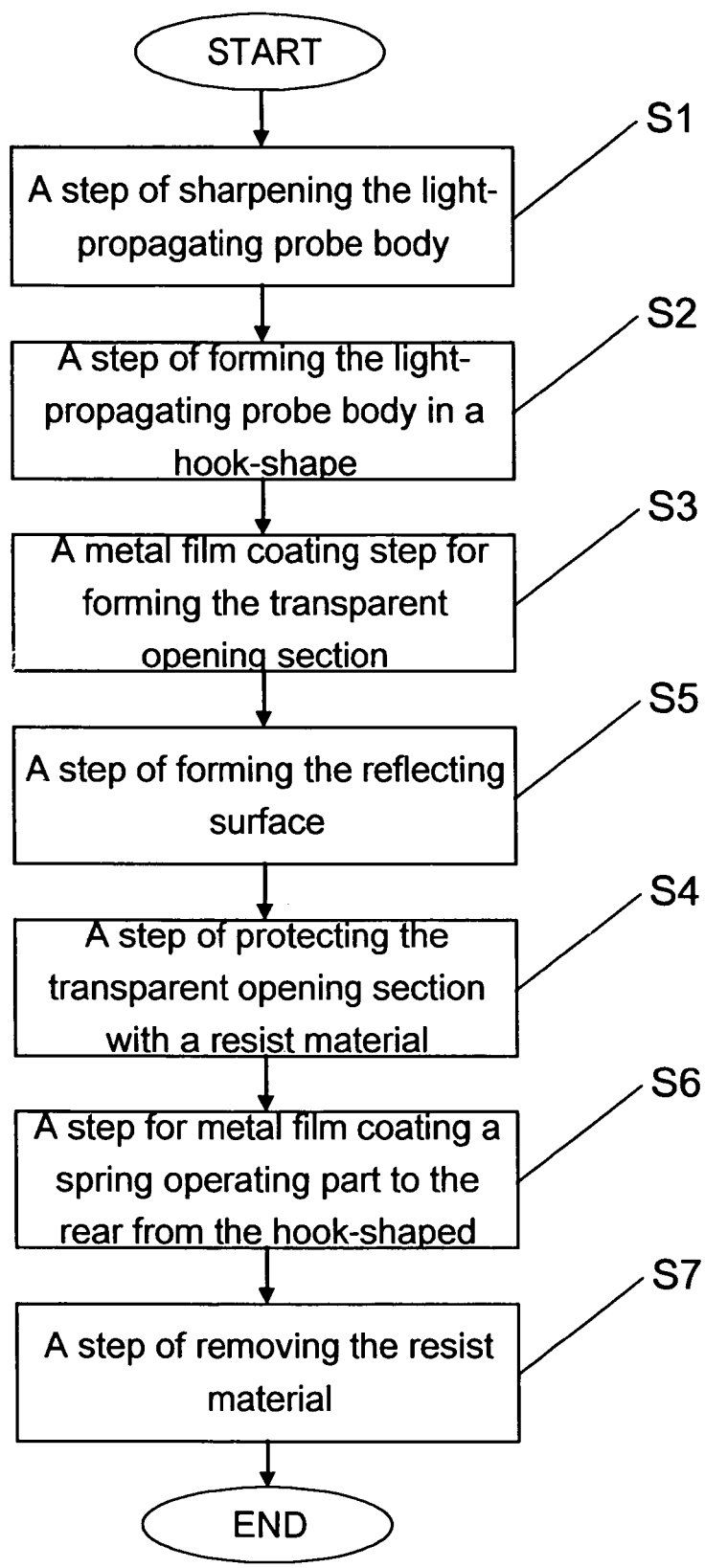
FIG. 4 is a flowchart of a manufacturing process for a light propagating probe for a near-field microscope of a second embodiment of the present invention.

A flowchart of a manufacturing process for a light-propagating probe for a near-field microscope of a second embodiment of the present invention is shown in FIG. 4. The second embodiment is different from the first embodiment in that the order of the step S4 of protecting the transparent opening with a resist material and a step S5 of forming the reflecting surface is changed over. Specifically, the light-propagating probe 6 can be manufactured in the processing order of the step S1 of sharpening the light-propagating body, the step S2 of forming the light-propagating body into a hook-shape, the metal film coating step S3 for forming the transparent opening section, the step S5 of forming the reflecting surface, the step S4 of protecting the transparent opening with a resist material, and the step S6 for metal film coating a spring operating part, and the step S7 of removing the resist material.

According to this light propagating probe manufacturing method, since the step S4 of protecting the transparent opening with a resist material is after the step S5 of forming the reflecting surface, there is no longer the effect of protection in step S5 of forming the reflecting surface, but it is possible to easily manufacture a high efficiency hook-shaped light-propagating probe 6 easily with good reproducibility, similarly to the first embodiment.

Figure 5:
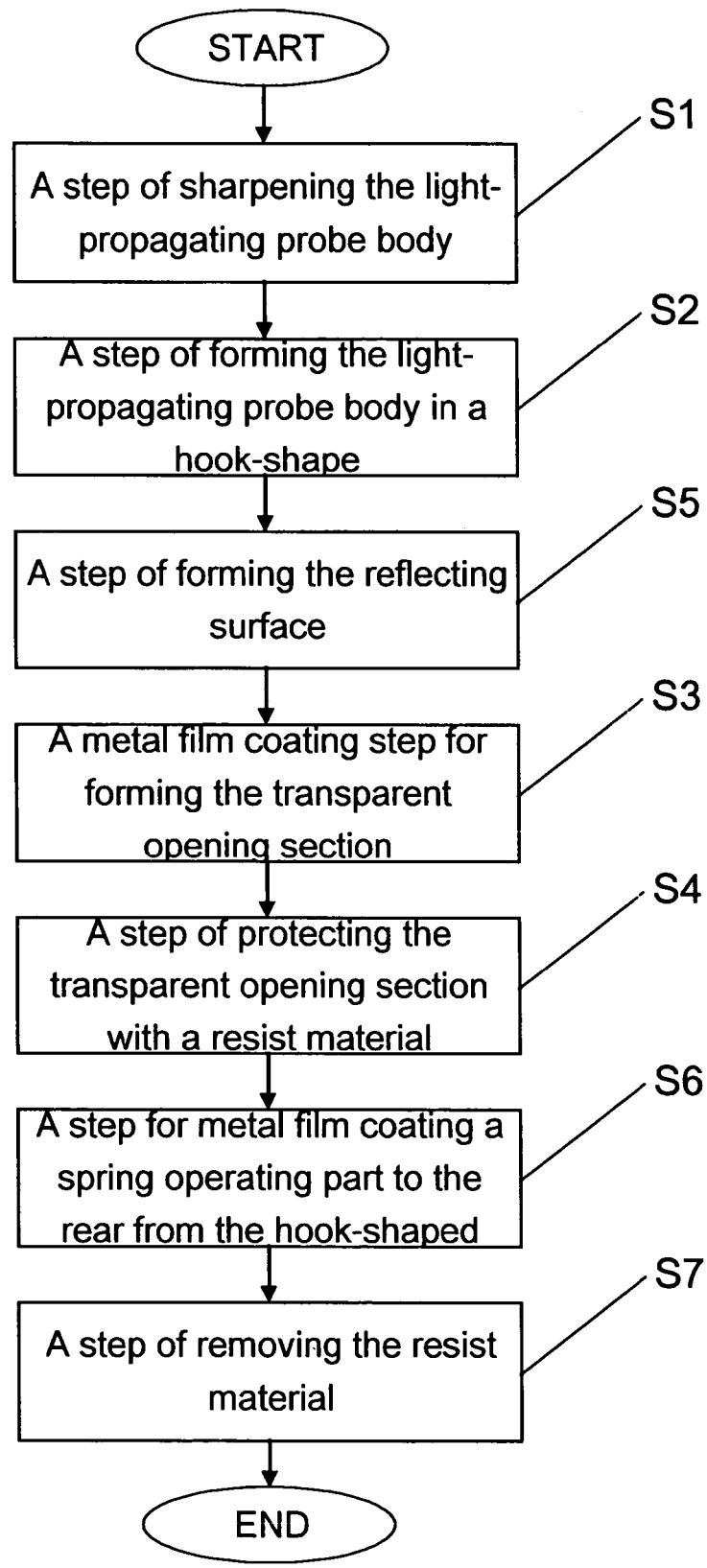
FIG. 5 is a flowchart of a manufacturing process for a light propagating probe for a near-field microscope of a third embodiment of the present invention.

A flowchart of a manufacturing process for a light-propagating probe for a near-field microscope of a third embodiment of the present invention is shown in FIG. 5. The third embodiment is different from the first embodiment in that the step S5 of forming the reflecting surface is carried out immediately after the step S2 of forming the light-propagating body into a hook-shape. Specifically, the light-propagating probe 6 can be manufactured in the processing order of the step S1 of sharpening the light-propagating body, the step S2 of forming the light-propagating body into a hook-shape, the step S5 of forming the reflecting surface, the metal film coating step S3 for forming the transparent opening section, the step S4 of protecting the transparent opening with a resist material, the step S6 for metal film coating a spring operating part, and the step S7 of removing the resist material.

According to this light-propagating probe manufacturing method, it is possible to easily manufacture a high efficiency hook-shaped light-propagating probe 6 easily with good reproducibility, similarly to the first embodiment. It is also possible to complete processing to form the optical fiber 1 itself in advance, and to carry out only later processes relating to film formation. It is therefore possible to carry out manufacture efficiently since it is possible to carry out manufacture by intensifying similar processes.

Next, the manufacturing process for the light-propagating probe 6 will be described in detail.

A single mode fiber having a core diameter appropriate to the used wavelength region and a clad diameter of 125 μm can be used as the optical fiber 1. The optical fiber 1 is a dielectric, and since it is easy for foreign matter to be attached due to static electricity the manufacturing process for the light-propagating probe described in the following is preferably generally carried out in an anti-static environment. Specifically, it is generally effective to use a static eraser blower called an ionizer, or an anti-static sheet in the operating environment, as well as carrying out temperature and humidity control, or safeguarding the light propagating body during manufacture using a metal case that does not charge.

From 2 cm to 10 cm of synthetic resin is removed from the end of the optical fiber 1, and cleaned by wiping with a dust-free wiper etc. that has been impregnated with an organic solvent such as alcohol. At this time, a section where synthetic resin coating has been removed can be effectively cleansed using ultrasonic cleaning with an organic solvent such as alcohol or acetone. In particular, ultrasonic cleaning using an organic solvent mainly composed of N-methyl-2-pyrrolidone is effective in removing ultra-fine foreign matter.

First of all, fault testing of the optical fiber is carried out. There are cases where cylindrical cavity faults exist in the clad 3 of commercial optical fibers. If such faults exist in the sharpened section 7, it will cause faults in the metal film coating 9, culminating in the occurrence of light leakage and significant lowering of resolution.

Figure 6:
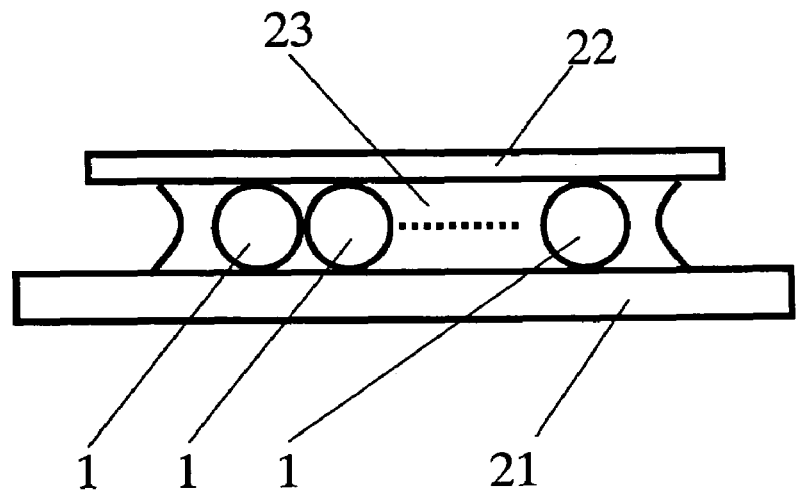
FIG. 6 is a structural diagram of a cylindrical cavity fault test sample.

The structure of a cylindrical cavity fault test sample is shown in FIG. 6. A light fiber 1 that is being subjected to testing, and after removal therefrom of the synthetic resin coating (jacket), is placed on a first glass plate 21 such as a glass slide for microscopic observation, refractive index matching oil 23 having the same refractive index as the optical fiber 1 is dripped on, and a second glass plate 22 such as a slide glass or cover glass is placed on top. At this time testing efficiency for the optical fiber 1 is high if a plurality of fibers are arranged. If this sample is observed using an optical microscope, since matching oil 23 fills around the optical fibers 1 it is possible to observe the inside of the optical fibers with reduced influence from the reflecting surface of the optical fibers 1. In particular, if dark-field observation is used, it is possible to vividly observe the external form of cavity defects. This fault test is preferably carried out for the ends of the optical fibers themselves making the actual probes themselves, but because this type of fault is often spread out over distances of from a few tens of cm to a few m, it is also possible to cut from a few mm to a few tens of mm close to the section actually used in manufacture as a test sample.

Next, a probe fixing section 4 is arranged on the cover section of the optical fiber 1.

Figure 7:
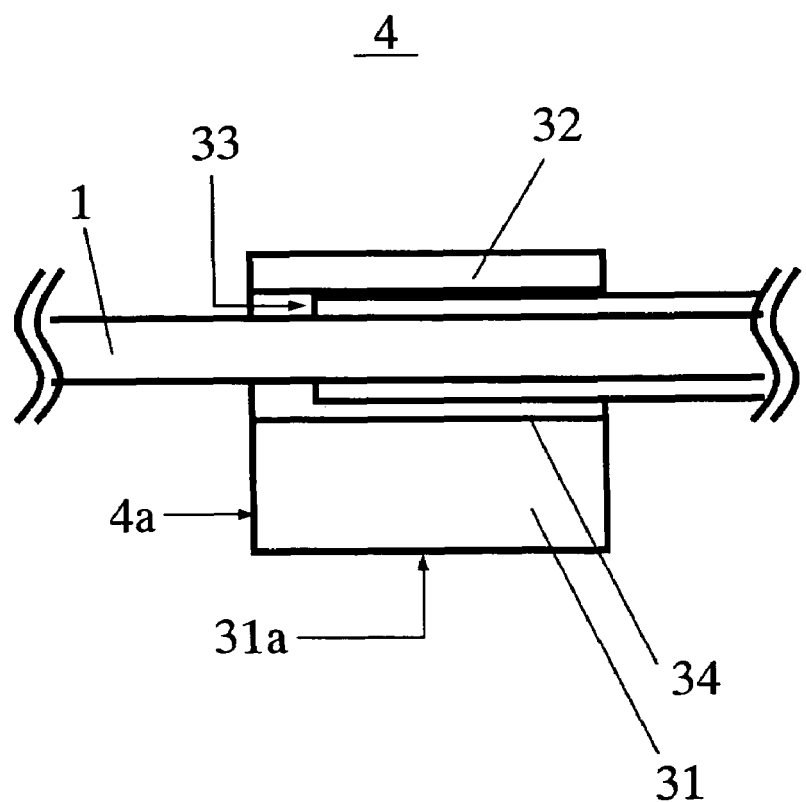
FIG. 7 is a cross sectional drawing showing the structure of the probe fixing section.

A cross sectional drawing showing the structure of the probe fixing section is shown in FIG. 7. The probe fixing section 4 functions as a reference surface for handling of the optical fiber 1, probe length or rotation direction. For example, the optical fiber 1 is placed in a support body 31 having a V-groove 34 matching the cover diameter of the optical fiber 1, and the optical fiber 1 is pressed by a press plate 32 to constitute the probe fixing section 4. At this time, a covered end 33 of the optical fiber 1 is preferably positioned in a range from the end surface 4a of the probe fixing body 4 to within ½ the length of the probe fixing body 4. Bending of the optical fiber 1 due to displacement of the support body 31 and the press plate 32 are prevented by providing this covered end 33 and it is possible to arrange reference surface 31a of the probe fixing body and the optical fiber 1 in a substantially parallel manner. It is also possible to implement by passing the optical fiber 1 through a product having a through hole matching the diameter of the covering of the optical fiber and joining. Here, a procedure is shown for arranging the fixing body 4 at a covered part of the optical fiber, but it is also possible to arrange the fixing body 4 on the clad 3 of the optical fiber 1.

The step S1 for sharpening the light-propagating probe body can be a thermal tension method using a carbon dioxide laser, or a chemical etching method using a main component of hydrofluoric acid. A description will first be given of a thermal tension method using a carbon-dioxide laser.

Figure 8:
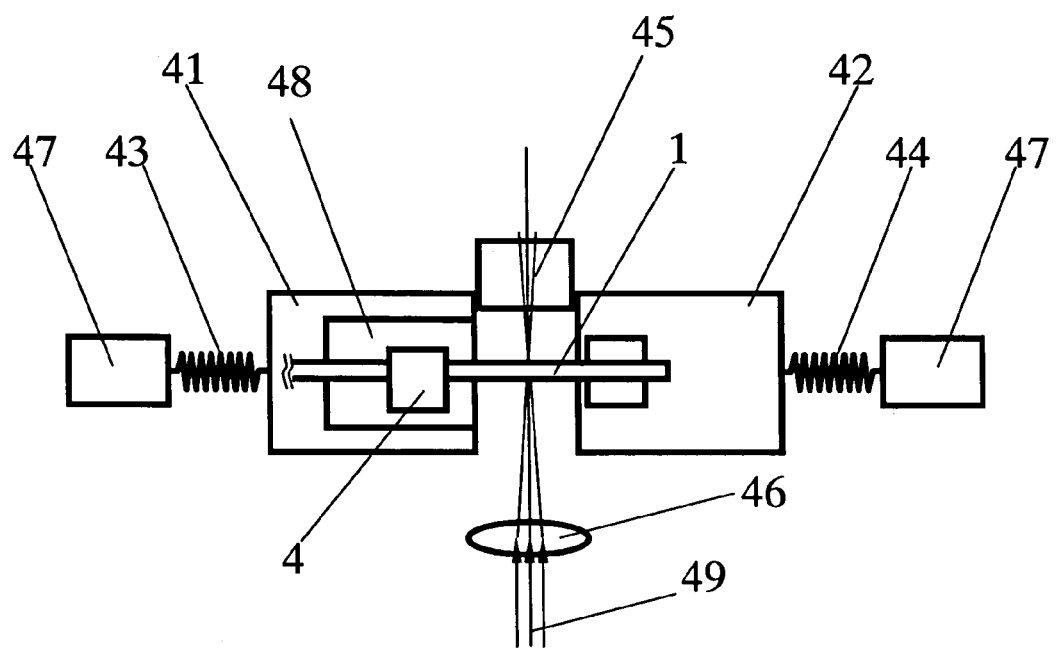
FIG. 8 is a schematic diagram of a thermal tension device using a carbon dioxide laser.

FIG. 8 is a schematic diagram of a thermal tension device (thermal puller) using a carbon dioxide laser. The fixing body 4 of the optical fiber 1 is fixed to an X-axis stage 48 arranged on a first slider 41. The tip of the optical fiber 1 is fixed to a second slider 42. A first spring mechanism 43 and a second spring mechanism 44 are respectively arranged on the first and second sliders 41 and 42. A tensile force adjustment mechanism 47 is attached to each spring mechanism. Tension is applied to the optical fiber 1 by the two spring mechanisms 43 and 44. In an initial state, the first and second sliders 41 and 42 are fixed to a central section by a stopper 45. Tension applied to the respective sliders can be independently adjusted by selecting a number of springs of the first spring mechanism 43 and the second spring mechanism 44, and adjusting tensile force using the tension adjustment mechanisms 47. The tension adjustment mechanisms 47 are, for example, mechanisms for adjusting the fixed end position of the first spring mechanism 43 and the second spring mechanism 44 using a feed screw mechanism. Carbon dioxide laser light 49 is focused by a focusing lens 46 and irradiated to an optical fiber 1 provided close to the focal point. The focusing lens 46 uses a cylindrical lens made of a material that is transparent to the carbon dioxide laser light 49, for example zinc selenium (ZnSe). A focal line of the focusing lens 46 is selected in the direction crossing the optical fiber 1, namely in a direction perpendicular to the paper of FIG. 8. In the case of using a cylindrical lens, since the focal line crosses the optical fiber 1 adjustment of the optical axis is easy. It is also possible to use a spherical lens as the focusing lens 46. In the case of using a spherical lens, it is possible to cause the energy of the carbon dioxide laser light to be focused on the optical fiber 1 more efficiently, and it is possible to heat the optical fiber 1 more efficiently.

Figure 9A:
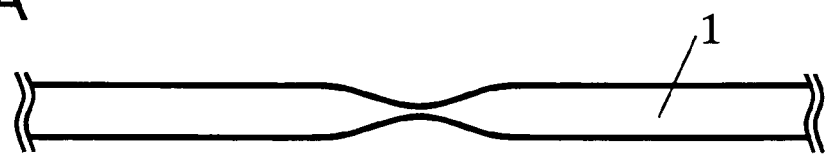
FIG. 9A is for a case where the tensile force on both ends is the same.
Figure 9B:
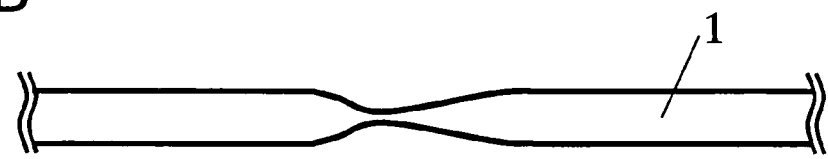
FIG. 9B is for a case where the tensile force on both ends is the different.

If the output of the carbon dioxide laser light 49 is raised while tension is applied to the optical fiber 1, constrictions occur in a part of the optical fiber 1 that is irradiated by the carbon dioxide laser light 49 due to heat softening. FIG. 9 is a schematic diagram of the constricted appearance of an optical fiber 1. FIG. 9A is for a case where the tensile force on both ends is the same, namely, the case where the number of springs of the first spring mechanism 43 and the second spring mechanism 44 are the same or the tension due to the tensile force adjustment mechanism 47 is symmetrical. FIG. 9B shows the case when the number of springs of the first spring mechanism 43 and the second spring mechanism 44 are different, or the tension due to the tensile force adjustment mechanism 47 is asymmetrical. In the case where tensile force is equal, since the carbon dioxide laser light 49 is irradiated to the same position on the optical fiber 1 symmetrical constriction arises. On the other hand, in the case where tension is different, since the first slider 41 and the second slider 42 move in a direction to balance tensile force according to stretching of the optical fiber 1, the constriction is asymmetrical. Accordingly, by adjusting tensile force in this step it is possible to adjust the length of the sharpened section 7. Also, by adjusting the position of the focusing lens 46 on the optical axis and shifting the position of the optical fiber 1 in front of or behind the focal point, it is possible to vary beam size of the carbon dioxide laser light 49 irradiated to the optical fiber 1. When the irradiation range is large, the portion of the optical fiber 1 that is softened spreads over a wide range, and the sharpened section 7 is made long. That is, it is also possible to adjust the length of the sharpened section by adjusting the position of the focusing lens 46.

Laser output is increased while gently applying tension at a comparatively small fixed output until the constriction of the optical fiber 1 reaches the desired diameter, to cause fracture. This output increase causes increase in output at a fixed rate according to time, for example, that is, it causes constant increase in output. Using this increase in output it is possible to adjust rate of tension to softening conditions of the optical fiber 1 at the time of fracture, and it is possible to effectively control the fracture diameter.

The appearance of this tension can be easily and safely observed using a camera unit (not shown) having a controllable CCD camera fitted to a microscope, for example.

The optical fiber 1 that has been made sharp using the tensile fracturing is made into a hook shape. The step S2 for forming the hook shape is a step for irradiating the carbon dioxide laser light to the hook shape section.

Figure 10:
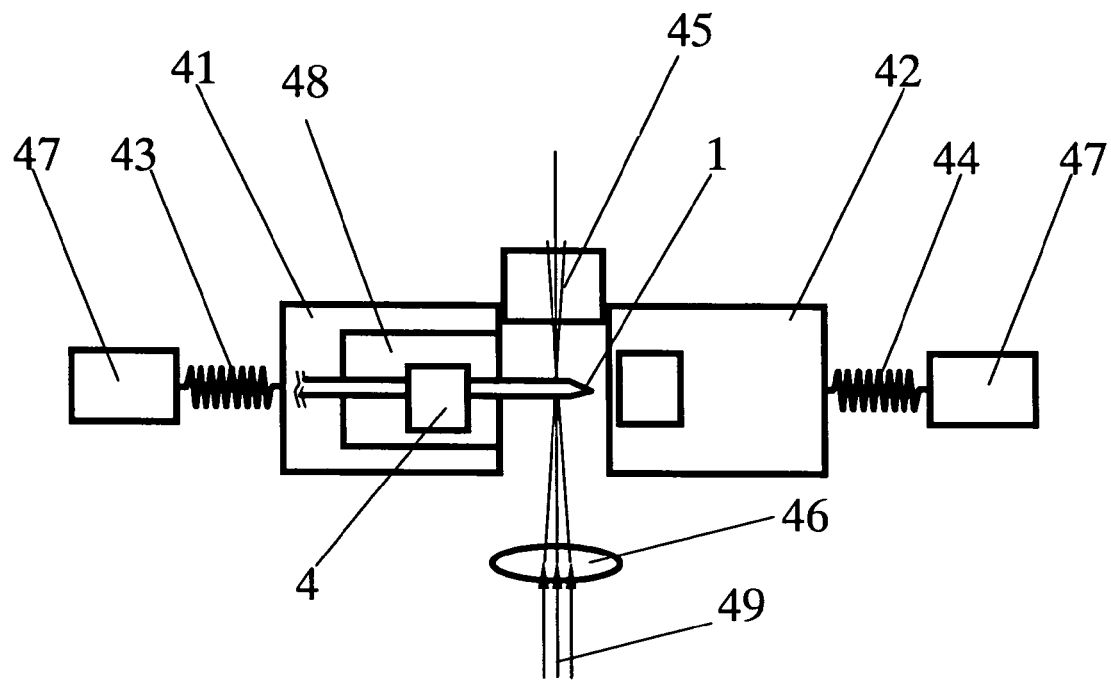
FIG. 10 is layout diagram for the formation device representing the hook shape forming process.

FIG. 10 is layout diagram for the formation device representing the hook shape forming process. FIG. 10 shows the state where, after causing tensile fracture of the optical fiber 1 using the thermal tension device using a carbon dioxide laser shown in FIG. 8, the first slider 41 is returned to the initial position with the optical fiber 1 remaining mounted on the X-axis stage. The position of the optical fiber 1 is adjusted using the X-axis stage, and carbon dioxide laser light 49 is irradiated to a section from 0.1 to 1.5 mm from the sharpened tip to cause transformation in the shape of the hook shape to an extent of from 60° to 90°, if it is 0° before transformation. Since the side that the light strikes absorbs a lot of heat compared to the rear side, the tip of the optical fiber 1 bends in the direction the light strikes due to surface tension accompanying softening. At this time, the reference surface 31a of the probe fixing body 4 is arranged at a right angle to the laser light, and a distance from the laser light to the end surface of the probe fixing body 4 is made constant. In this case, using this process it is possible to make the distance from the end surface of the probe fixing body 4 to the hook-shaped section constant, and it is possible to make the bending direction at right angles to the reference surface 31a of the probe fixing body 4. The curvature of the hook shape formation can be adjusted using the beam size of the irradiated carbon dioxide laser light 49. That is, if the focusing lens 46 is not used, the radius of curvature becomes, for example, 0.5 mm to 2 mm, and if the focusing lens 46 is used the radius of curvature is 0.5 mm or less. This hook shape formation process can be controlled while safely observing using a camera device fitted with a CCD camera, similarly to the thermal tension process using the carbon dioxide laser.

According to this hook shape forming process, it is possible to form a hook shape close to the tip of the optical fiber 1 easily and with good shape precision.

This process for forming the hook shape is normally carried out immediately after the thermal tension process using the carbon dioxide laser, but can also be carried out after wet chemical etching, which will be described next.

The tensile fracture optical fiber 1 has a tip diameter of from 100 nm to 300 nm. This tip is sharpened to 100 nm or less by wet chemical etching. Etching fluid uses a mixture of hydrofluoric acid, ammonium fluoride and water, and after being immersed in etching fluid for a desired time the optical fiber 1 is subjected to pure water cleansing. The immersion time differs depending on required tip diameter and etching fluid concentration. Also, the etching fluid has different etching rates for the core 2 and the clad 3 of the optical fiber, depending on composition, but a composition ratio for conditions of sharpening the tip section is used. For example, it is possible to use an etching fluid having a composition ratio of 50% hydrofluoric acid, 40% ammonium fluoride and water of 2:1:13, and carry out etching for 1 to 10 minutes.

The etching fluid is preferably temperature controlled to a fixed temperature close to room temperature or below room temperature using a water jacket etc. that uses a constant temperature circulating water tank.

Figure 11:
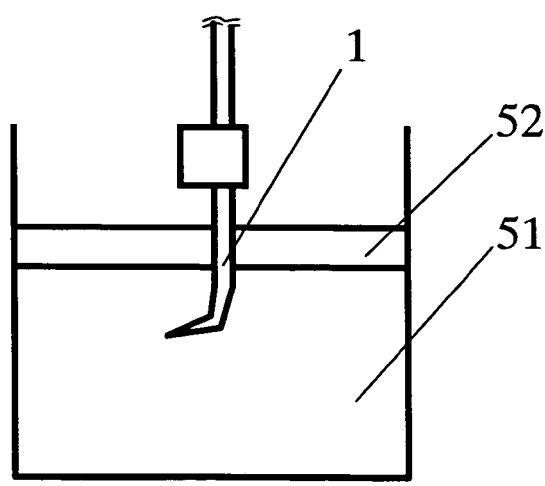
FIG. 11 is a schematic drawing showing an aspect of wet chemical etching using two layers etching.

When etching fluid mainly comprising hydrofluoric acid is made a first solution layer, it is also possible to use etching where a second solution layer is arranged on the first solution layer. The appearance of wet chemical etching using two layers etching is shown in FIG. 11. A second solution layer 52 uses a material that has a lower specific gravity than the first solution layer and will not react or mix with the first solution layer 51. The tip section of the optical fiber 1 is inserted into the first solution layer 51 and etched. As the second solution layer 52, an organic solvent such as hexane, heptane or octane, or a fatty oil such as mineral oil, vegetable oil or chemically synthesized oil, is used. By using the second solution layer, it is possible to prevent evaporation of harmful hydrofluoric acid into the atmosphere, and to prevent variation in composition of the etching fluid due to evaporation. In this case also, it is desirable to carry out temperature control of the etching fluid to close to room temperature using a water jacket that uses a constant temperature circulating water tank.

After the optical fiber 1 has been etched for a specified time using the two-layer etching, it is immediately washed, first with organic solvent cleaner and then by rinsing in water. The inorganic solvent washes off material of the second solution layer 52 that has become attached to the optical fiber 1, and acetone or alcohol type is used, but it is also possible to use other organic solvents that dissolve the second solution layer 52 and are water soluble.

With the explanation of FIG. 8, there is shown a sharpening process using thermal tension that uses a carbon dioxide laser, but it is also possible for the step S1 for sharpening the light propagating body to use a chemical etching method with hydrofluoric acid as a main component.

Figure 12A:
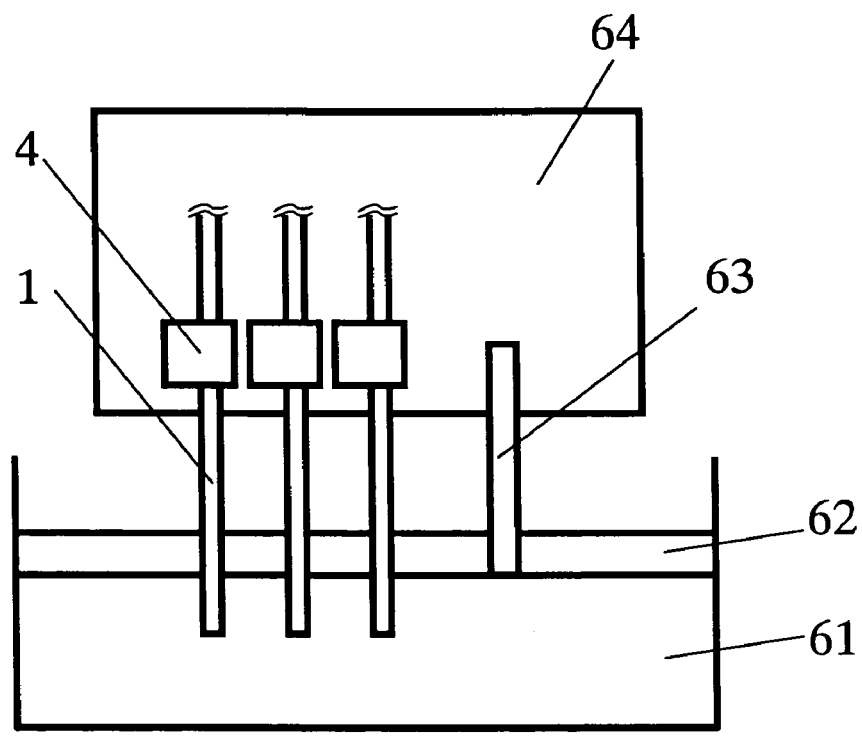
FIG. 12A is a schematic drawing showing the structure of an etching device.
Figure 12B:
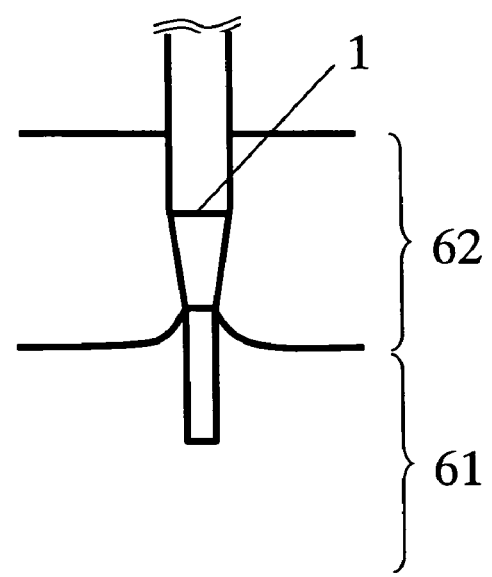
FIG. 12B is an enlarged schematic drawing of a sharpened part.

The process of sharpening using chemical etching is schematically shown in FIG. 12. FIG. 12A is a schematic drawing showing the structure of an etching device, and FIG. 12B is an enlarged schematic drawing of a sharpened part. A first solution layer 61 uses an etching fluid mainly composed of hydrofluoric acid, while the second solution layer 62 uses a material that has a lower specific gravity than the first solution layer and will not react or mix with the first solution layer 61. An optical fiber 1 from which processes up to arranging the probe fixing body 4 have been completed is attached to an etching jig 64. The etching jig 64 has a structure capable of being moved up and down by, for example, a Z-axis movement mechanism, and can put the optical fiber 1 into and remove it from the etching fluid. A length reference wire 63 constituting a reference for probe length is arranged in the etching jig 64 in advance. The etching jig 64 is lowered gently, the optical fiber 1 inserted into the first solution layer 61, and lowering of the etching jig 64 is stopped at a position where a length reference wire 63 reaches a boundary surface of the first solution layer 61 and the second solution layer 62. At the position where the length reference wire 63 reaches the boundary surface of the first solution layer 61 and the second solution layer 62, a meniscus is formed once the length reference wire 63 reaches the boundary surface, which means it can be detected by careful observation. Easy observation is made possible using a magnifying glass having a comparatively large operating distance, such as a stereoscopic microscope, as required.

An aspect of the etching for sharpening is shown in FIG. 12B. A meniscus is formed at the boundary surface of the first solution layer 61 and the second solution layer 62 for the optical fiber 1. At this time, the first solution layer 61 side of the optical fiber 1 is etched to gradually reduce the diameter. Since the meniscus increases in height accompanying the reduction in diameter, the optical fiber 1 automatically takes on a taper shape and the sharp section 7 is formed. Etching is completed when the section immersed in the first solution layer 61 is completely etched.

Hydrofluoric acid at a concentration of 50% or a mixture of hydrofluoric acid an ammonium fluoride is used as the material of the first solution layer 61. Also, an organic solvent such as hexane, heptane or octane, or a fatty oil such as mineral oil, vegetable oil or chemically synthesized oil, is used as the second solution layer 62 similarly to the description relating to the embodiment of FIG. 11. Besides forming a meniscus at the boundary surface with the first solution layer 61 to cause etching to progress when the optical fiber 1 is inserted, the second solution layer 62 also plays a role of preventing evaporation of the hydrofluoric acid. The length reference wire 63 uses a material that has chemical resistance to the hydrofluoric acid and the organic solvent, such as gold wire or platinum wire.

The etching fluid is preferably temperature controlled to a fixed temperature close to room temperature or below room temperature using a water jacket etc. that uses a constant temperature circulating water tank. Also, after the optical fiber 1 has been etched it is immediately washed, first with organic solvent cleaner and then by rinsing in water. Further, this etching can obtain stable etching shape reproducibility by using an air spring type vibration isolation table.

A plurality of the optical fibers 1 are preferably attached to the etching jig 64, to improve manufacturing efficiency by etching a single time.

The metal film coating step S3 for forming the transparent opening and the step S6 for metal film coating the spring operating parts are metal film coating steps using a rotational evaporation method.

Figure 13:
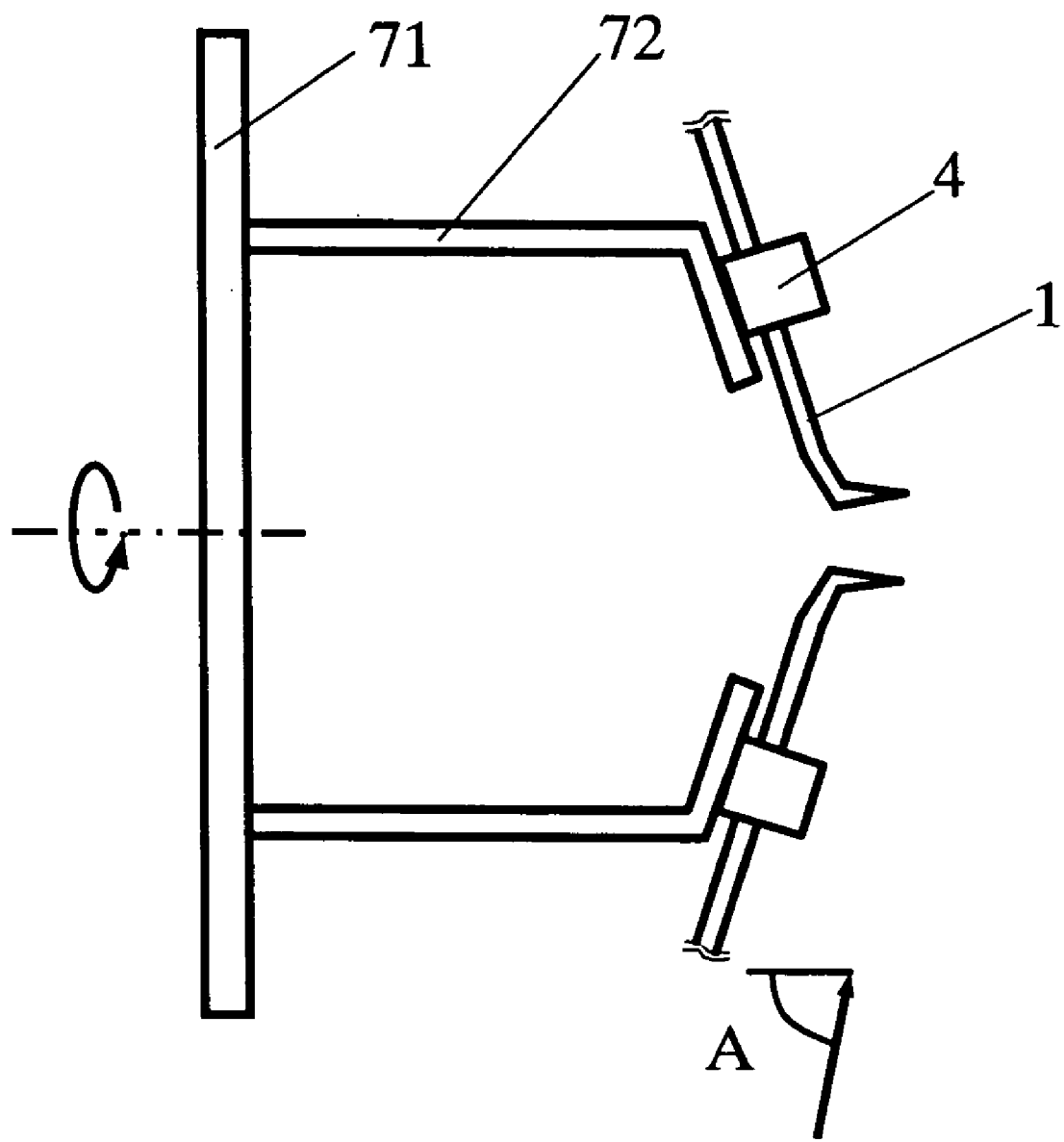
FIG. 13 is a drawing showing a metal film coating step for forming a transparent opening of the present invention.

FIG. 13 is a drawing showing a metal film coating step for forming the transparent opening 8, and shows a state where optical fibers 1 are arranged on a jig for rotational evaporation. Optical fiber attachment arms 72 are arranged on a rotating plate 71. Tip sections of the optical fiber attachment arms are bent at the same angle as a formation angle of a hook shape of the optical fiber 1. The optical fibers 1 are fixed to the optical fiber attachment arms using probe fixing bodies 4. At this time, the tips of the hook-shaped sections have the same rotational center axis as the rotating plate, and are arranged substantially parallel close to the center. The number of optical fibers arranged is from 1 to a few tens. Manufacturing efficiency is further improved greater the number of optical fibers 1 handled in a single rotational evaporation process.

The rotational evaporation jig on which the optical fibers 1 are arranged is attached to a vacuum deposition unit having a rotating mechanism, and vacuum deposition of a desired material is carried out to a desired thickness while rotating. At this time, a deposition angle A is selected from a range of 20° to 90° with respect to a direction in which the tip section is facing. The deposited film thickness is a thickness required to shield light, and specifically from 30 nm to 1,000 nm, deposition rate is 5 nm per second or greater, and is preferably a high speed deposition of 10 nm to 100 nm per second, to be effective in forming a smooth metal film with low surface roughness. Also, the rate of rotation of the rotating jig is selected in the range from 30 to 1,000 revolutions per minute.

According to this metal film coating step for forming the transparent opening, as well as being able to form a microscopic transparent opening 8, it is possible to form a smooth metal film coating with few faults using high speed deposition and high speed rotation.

Also, by having the metal film coating step for forming the transparent opening 8 carry out deposition twice for the overall thickness, it is possible to prevent the occurrence of faults such as pin holes. At this time, after the first deposition, a vacuum chamber is opened once, or vacuum discharge is stopped, oxygen gas is introduced until a desired pressure is reached and then the chamber is opened, followed immediately by discharging a vacuum again, and carrying out the second deposition.

According to this process, it is possible to cause a discontinuity in crystal growth of the metal film, making it possible to inhibit grain growth. As a result, it is possible to form a smoother metal film with few pin holes, and it becomes possible to manufacture a high resolution, low-background, high efficiency light propagating probe.

As the material for the metal film, it is possible to use a metallic material such as aluminum, aluminum silicon alloy, gold, or silver. Also, in the case of two time deposition, as well as using a two-layer structure of the same material it is also possible to use a laminated structure with any of silver/gold, chrome/gold, aluminum/gold, or aluminum silicon alloy/gold.

Figure 14:
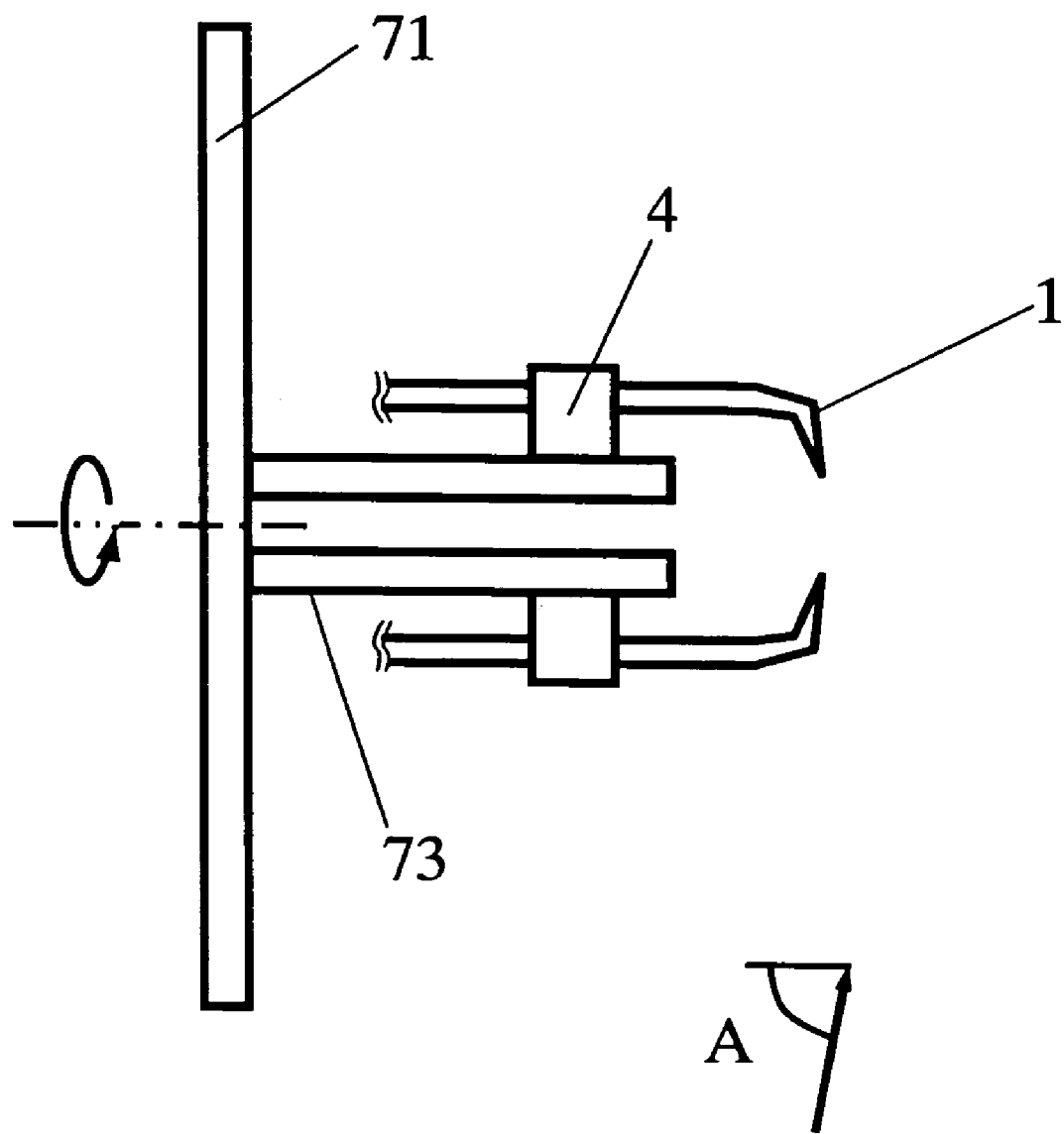
FIG. 14 is a drawing showing the step of metal film coating the spring operating part of the present invention.

FIG. 14 is a drawing showing the step of metal film coating the spring operating part 10, and shows the state where an optical fiber 1 having a transparent opening protected by a resist material is placed in a rotating deposition jig. Optical fiber attachment arms 73 are arranged on a rotating plate 71. The shape of the optical fiber attachment arms 73 is different from the embodiment shown in FIG. 13, and the spring operating parts are arranged substantially parallel to the rotational center of the rotating plate, or the vicinity of the center point. The vapor deposition method is no different from the description of FIG. 13 with respect to material etc.

Figure 15:
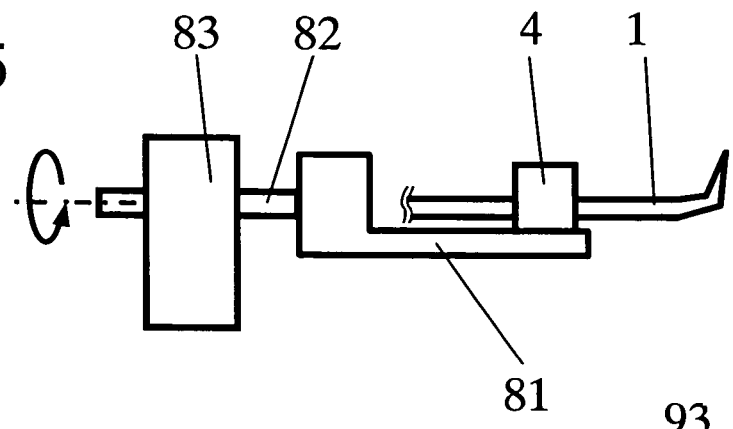
FIG. 15 is a drawing showing another step of metal film coating the spring operating part of the present invention.

FIG. 15 is a drawing showing another step of metal film coating the spring operating part of the present invention, and shows the state where an optical fiber 1 having a transparent opening protected by a resist material is placed in a film formation jig. The optical fibers 1 are fixed to a probe support platform 81 using the probe fixing body 4. A center shaft 82 is attached to the probe support platform 81, and the center shaft 82 is further fixed to a shaft fixing mechanism 83. The spring operating part 10 of the optical fiber 1 and the center shaft 82 have the same straight shape, and are arranged substantially parallel to each other, and it is possible to fix then so that the optical fiber 1 is caused to rotate with the center shaft 82 as a rotating shaft. Accordingly, film formation is possible at an arbitrary angle. Besides being able to utilize vacuum deposition, this film formation method also aims to use a sputtering device that requires limited vacuum chamber space. Using this film formation jig, it is possible to form a favorable metal film coating by carrying out film formation from at least two directions of rotating the spring operating part 10, preferably from three or more directions. If a sputtering device is used, it is possible to carry out film formation with a high melting point metal or alloy that would be difficult with vapor deposition.

The step S5 for forming the reflecting surface is a step of mechanically polishing the optical fiber 1 formed into a hook shape.

Figure 16A:
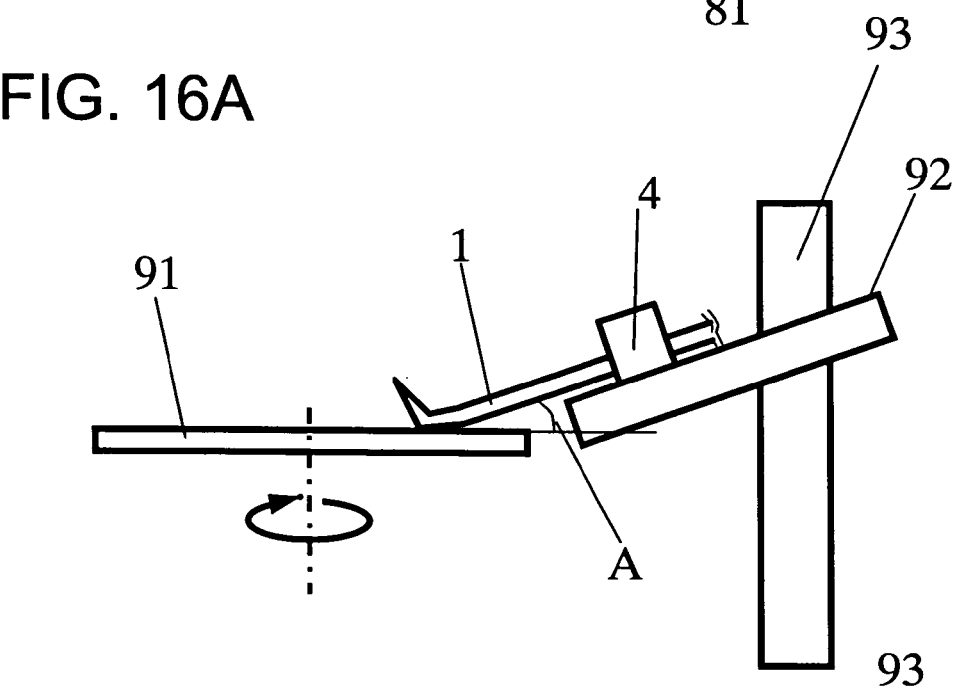
FIG. 16 is a drawing showing the step of forming the reflecting surface, FIG. 16A showing a state before polishing is started, and FIG. 16B showing a state during polishing.
Figure 16B:
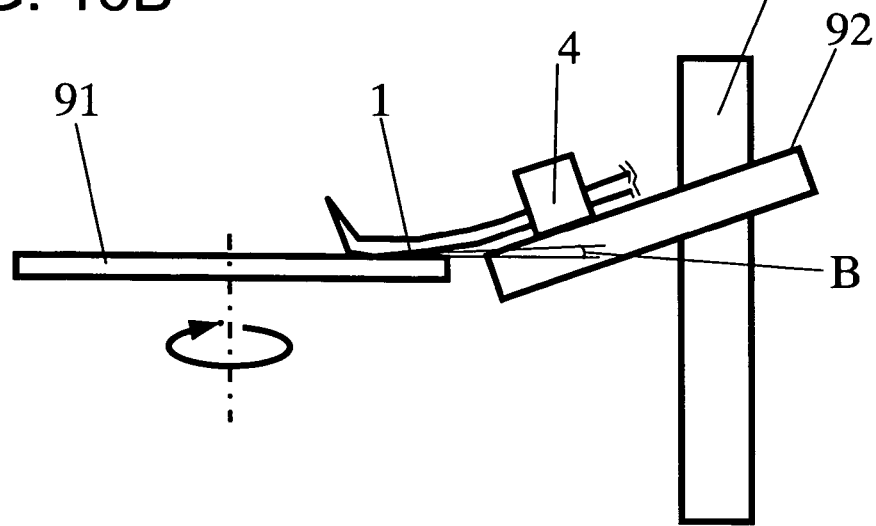

FIG. 16 is a drawing showing the step of forming the reflecting surface, FIG. 16A showing a state before polishing is started, and FIG. 16B showing a state during polishing. The optical fiber 1 that has been sharpened and formed into a hook shape is fixed to a polishing stage 92 by the probe fixing body 4 with the tip section facing upwards. The polishing stage 92 is configured capable of moving up and down using a Z-axis movement mechanism 93. An angle A of the optical fiber 1 with respect to a polishing surface of a disc-shaped rotating polishing plate 91 is set to an angle of from 20° to 60°. If the polishing stage 92 is moved downwards by the Z-axis movement mechanism 93 a rear surface of an upper part of the hook shape of the optical fiber 1 comes into contact with the polishing plate, and if the polishing stage 92 is lowered further the spring operating part 10 is flexed to generate polishing pressure. The polishing stage is fixed at a position where an angle B between the polishing surface of the polishing plate 91 and the polishing section of the optical fiber becomes a desired angle, for example, greater that 0° and less than angle A, and fixed duration polishing is carried out. The angle B, that is the angle of the reflecting surface 5, is selected from 0.5° to 5°. The rotating polishing plate used can be a wet type, but as long as a mirror surface can be obtained, a dry process can also be used. The spring constant of the spring operating part 10 for generating polishing pressure is selected using length of the spring operating part, namely mounting position of the probe fixing body 4. Specifically, the mounting position is designed so as to be able to cope with various factors, such as specification of a device used as the probe fixing body 4 and the structure of the vapor deposition unit, but is, for example, from 5 mm to 50 mm. The rotating direction of the rotating polishing plate 91 is selected to be a direction such that the polishing direction is from the probe fixing body 4 towards the tip. This polishing direction is a direction that does not cause compressive stress (buckling) in the optical fiber 1.

Next, the step S4 for protecting the transparent opening using a resist material will be described in detail.

Figure 17:
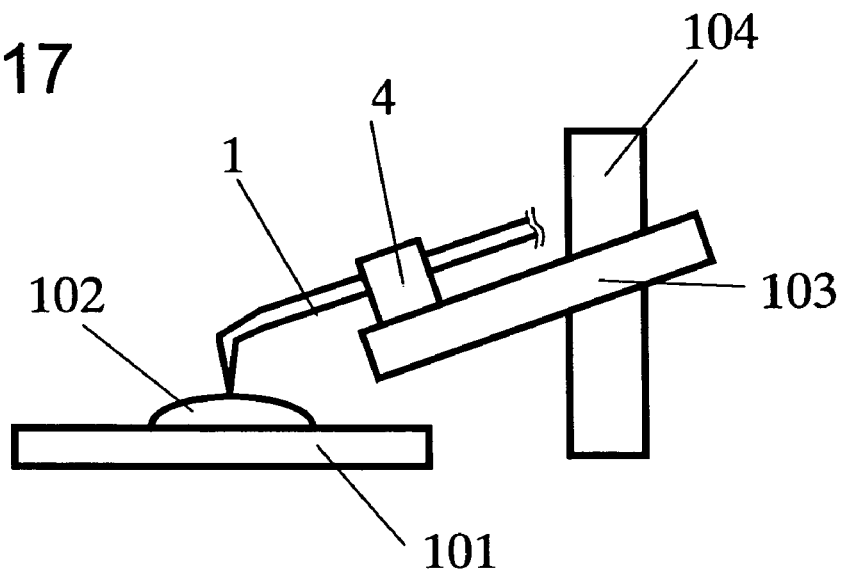
FIG. 17 is a drawing showing the step of protecting the transparent opening of this invention using a resist material.
Figure 18:
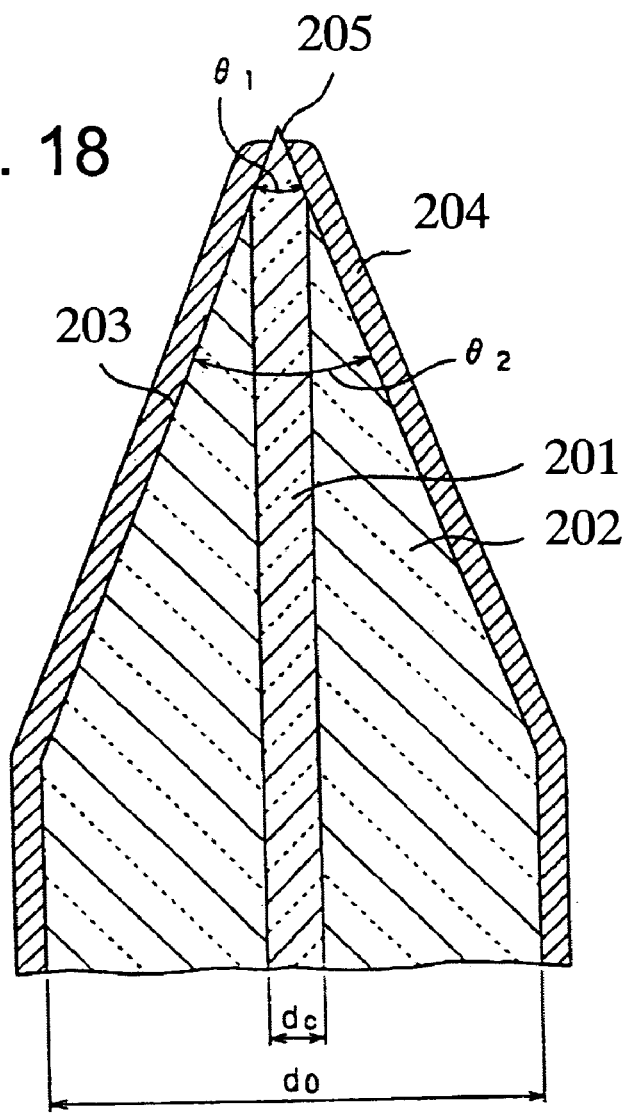
FIG. 18 is a drawing showing a manufacturing method for an optical fiber probe of the related art.

FIG. 17 is a drawing showing the step of protecting the transparent opening using a resist material. A resist material 102 is dripped onto a flat plate-shaped base substrate 101, and is formed into a hemispherical shape by surface tension. An optical fiber 1 for which at least the step of forming the transparent opening has been completed is fixed toga probe stage 103 having Z-axis movement mechanism 104, using the probe fixing body 4. The probe stage 103 is gradually lowered while the tip section of the optical fiber 1 is observed, and at the point in time where from 5 µm to 200 µm of the sharpened section of the optical fiber 1 is inserted from the tip in the resist material the probe stage 103 is raised.

Using this step, it is possible to coat only the tip section of the optical fiber with the resist material 102. If sufficient coating is not obtained with one process, the sharpened section is inserted into the resist material 102 and pulled out again until a desired coating is obtained while carrying out observation with a microscope. As the substrate 101, it is possible to use, for example, a slide glass for a microscope that can be obtained easily. Also, resin material mainly composed of butyl acetate, ethyl acetate and nitrocellulose has been used as the resist material, but it is also possible to use photo resist used in semiconductor manufacture, or wax, etc.

According to this step of protecting the transparent opening with a resist material, it is possible to reliably coat the transparent opening without damaging the transparent opening. Also, since the resist material 102 is an extremely small disposable amount, it is possible to carry out stable coating without sequentially varying the concentration even when using a resin with a lot of volatile components.

Since the step of metal coating the spring operating part is carried out with the resist material still covering the probe tip, there is the possibility of deterioration due to heat at the time of vapor deposition. The step S7 of removing the resist material is a step of removing the resist material by ultrasonic cleaning with an organic solvent. An organic solvent having N-methyl-2-pyrrolidone as main components has been used as the organic solvent, but it is also possible to use an organic solvent having alcohol or acetone, etc. as long as it is possible to remove the resist.

Manufacturing methods for a light-propagating probe for a near-field microscope have been described above. Since the optical fiber is a dielectric, it is easy for microscopic particles of foreign matter to become attached due to static electricity. To combat this, ultrasonic cleansing using an organic solvent mainly composed of N-methyl-3-pyrrolidone makes it possible to effectively carry out removal of microscopic amounts of foreign matter. Accordingly, in each of the steps described in the above described embodiments, it is preferable to carry out ultrasonic cleansing using an organic solvent mainly composed of N-methyl-3-pyrrolidone, as required.

According to the present invention as described above, by having a manufacturing method for a light propagating probe comprising a step of sharpening the light-propagating probe body, a step of forming the light-propagating probe body in a hook-shaped, a step of forming a reflecting surface, a metal film coating step for forming the transparent opening section, a step of protecting the transparent opening section with a resist material, a step for metal film coating a spring operating part to the rear from the hook-shaped section, and a step of removing the resist material, even if the process sequence is partially altered it is possible to manufacture a high efficiency hook-shaped light propagating probe easily and with good reproducibility.

Also, the step of sharpening the light propagating probe can be carried out using a thermal tension step using a carbon dioxide laser, and it is possible to form a high precision tip with good reproducibility.

Further, it is possible for the step sharpening the light propagating probe to be carried out using chemical etching, and with a structure where etching fluid etching fluid has a solvent layer mainly made up of hydrofluoric acid and a solvent layer of organic solvent or fatty oil with a low specific gravity, in addition to allowing etching with good reproducibility it is possible to prevent evaporation of the hydrofluoric acid and the safety of the manufacturing process is improved.

Also, by carrying out a step of testing for presence or absence of long cylindrical cavity faults within the light propagating body, it is possible to prevent the occurrence of defects in the light propagating probe due to faults, and it is possible to improve yield.

The step of forming the light propagating body into a hook shape is carried out using a step of irradiating carbon dioxide laser light to a desired position close to the tip section of the sharpened light propagating body, which makes it possible to manufacture a hook shape with good shape reproducibility. Further, the step of forming the reflecting surface is a step of bringing a side of the tip section opposite the hook-shaped section of the light propagating body into contact with a rotating polishing plate and carrying out mechanical polishing, and by carrying out the pressing action utilizing the resilience of the light propagating body itself it is possible to easily form a reflecting surface with positional precision, angular precision, and good shape reproducibility.

Also, the metal film coating step for forming the transparent opening is a vacuum deposition step using a rotational evaporation jig to carry out evaporation while rotating the light propagating body, and because the rotational evaporation jig has a structure where the light propagating body is held so that the rotational axis of the jig is the same as or substantially parallel to the central axis of the tip section of the light propagating body that has been sharpened and formed into a hook shape, it is possible to easily form a transparent opening. Also, the vacuum evaporation step can be carried out in two stages, and between a first vacuum evaporation step and a second vacuum evaporation step, the vacuum chamber is opened to the atmosphere, or discharge of vacuum is stopped, oxygen gas is introduced until a desired pressure is attained and left for a fixed time, making it possible to coat with a smooth light blocking film having few defects due to optical background, and it is possible to form a transparent opening with good reproducibility.

Also, the step of metal film coating the spring operation part rearwards from the hook-shaped section is a vacuum evaporation step using a rotational evaporation jig to carry out evaporation while rotating the light propagating body, and a step for film forming from at least two direction of rotations around a central axis of the spring operation part, and according to these metal film coating steps it is possible to easily metal film coat a spring operation part.

Further, since the step of protecting the transparent opening with a resist material drips microscopic amounts of a resist material onto a flat plate, and inserts the transparent opening into a globular section formed due to the surface tension of the resist material itself using a precision stage, it is possible to coat the transparent opening reliably and without damaging the transparent opening.

Removal of the resist is achieved by ultrasonic cleansing using a cleansing agent mainly composed of N-methyl-2-pyrrolidone, and enables effective removal of the resist material.

Also, handling of the light propagating body is carried out using antistatic means such as an ionizer, antistatic sheet, metal case for light propagating body management, temperature control etc., which means that it is possible to prevent defects in the metal film coating caused by impurities, and it is possible to manufacture a light propagating probe having high resolution and low background.

What is claimed is:

1. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
    a step of sharpening the light-propagating body;
    a step of forming the light-propagating body in a hook-shape;
    a step of forming the reflecting surface;
    a metal film coating step for forming the transparent opening;
    a step of protecting the transparent opening with a resist material;
    a metal film coating step for coating at least the reflecting surface; and
    a step of removing the resist material.

2. A method of manufacturing a light-propagating probe for a near-field microscope according to claim 1; wherein the steps are carried out in the order of:
    a step of sharpening the light-propagating body;
    a step of forming the light-propagating body in a hook-shape;
    a metal film coating step for forming the transparent opening;
    a step of protecting the transparent opening with a resist material;
    a step of forming the reflecting surface;
    a metal film coating step for coating at least the reflecting surface; and
    a step of removing the resist material.

3. A method of manufacturing a light-propagating probe for a near-field microscope according to claim 1; wherein the steps are
    executed in the order of:
    a step of sharpening the light-propagating body;
    a step of forming the light-propagating body into a hook-shape;
    a metal film coating step for forming the transparent opening;
    a step of forming the reflecting surface;
    a step of protecting the transparent opening with a resist material;
    a metal film coating step for coating at least the reflecting surface; and
    a step of removing the resist material.

4. A method of manufacturing a light-propagating probe for a near-field microscope according to claim 1; wherein the steps are
    executed in the order of:
    a step of sharpening the light-propagating body;
    a step of forming the light-propagating body into a hook-shape;
    a step of forming the reflecting surface;
    a metal film coating step for forming the transparent opening;
    a step of protecting the transparent opening with a resist material;
    a metal film coating step for coating at least the reflecting surface; and
    a step of removing the resist material.

5. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:

a step of sharpening the light-propagating body;
a step of forming the light-propagating body in a hook-shape;
a step of forming the reflecting surface;
a metal film coating step for forming the transparent opening;
a step of protecting the transparent opening with a resist material;
a metal film coating step for coating at least the reflecting surface; and
a step of removing the resist material,
wherein the step of sharpening the light-propagating body includes applying a tension to the light-propagating body using a pair of spring mechanisms, irradiating carbon dioxide gas laser light by focusing with a lens, and, after locally heating the light-propagating body to cause tension fractures, reshaping the tip section using wet chemical etching.

6. A method of manufacturing a light-propagating probe for a near-field microscope according to claim 5 wherein the pair of spring mechanisms are independently adjustable spring mechanisms, and further comprising independently adjusting respective spring constants or initial tension of the spring mechanisms.

7. A method of manufacturing a light-propagating probe for a near-field microscope according to claim 5; wherein the lens for focusing the carbon dioxide gas laser light is a cylindrical lens, and further including focusing the carbon dioxide gas laser light in a direction where a line focal point crosses the light-propagating body, and adjusting the position of the light-propagating body to the focal point or in front of or behind the focal point.

8. A method of manufacturing a light-propagating probe for a near-field microscope according to claim 5; wherein the lens for focusing the carbon dioxide gas laser light is a spherical lens, and further including focusing the carbon dioxide gas laser light, and adjusting the position of the light-propagating body to the focal point or in front of or behind the focal point.

9. A method of manufacturing a light-propagating probe for a near-field microscope according to claim 5; further including, after the carbon dioxide gas laser light has been irradiated at a comparatively small output such that the light-propagating body displays slight stretching until the light-propagating body stretches a specified amount, increasing the output to cause fracture.

10. A method of manufacturing a light-propagating probe for a near-field microscope according to claim 9; wherein, during increasing the output to cause fracture, the output of the carbon dioxide gas laser is increased at a fixed rate.

11. A method of manufacturing a light-propagating probe for a near-field microscope according to claim 5; wherein the step of irradiating the carbon dioxide gas laser light to cause tensile fracture of the light-propagating body is simultaneously observed using a camera, and confirms an optical axis and monitors stretching state of the light-propagating body.

12. A method of manufacturing a light-propagating probe for a near-field microscope according to claim 5; wherein the wet chemical etching includes a step of immersing the light-propagating body that has been subjected to tension fracture in an etching fluid mainly comprising hydrofluoric acid to further sharpen the tip section.

13. A method of manufacturing a light-propagating probe for a near-field microscope according to claim 5; wherein the wet chemical etching includes a step of immersing the light-propagating body that has been subjected to tension fracture in an etching fluid that comprises a first solution layer mainly comprising hydrofluoric acid, and a second solution layer having a lower specific gravity than the first solution layer, and not reacting or mixing with the first solution layer, to further sharpen the tip section.

14. A method of manufacturing a light-propagating probe for a near-field microscope according to claim 12; wherein the etching solution is temperature controlled to a fixed temperature.

15. A method of manufacturing a light-propagating probe for a near-field microscope according to claim 13; wherein the wet chemical etching includes a step of washing the light-propagating body using an organic solvent that dissolves the material constituting the second solution layer, and is water soluble.

16. A method of manufacturing a light-propagating probe for a near-field microscope according to claim 1; wherein the step of sharpening the light-propagating body includes immersing the light-propagating body in an etching fluid that comprises a first solution layer mainly comprising hydrofluoric acid, and a second solution layer having a lower specific gravity than the first solution layer, and not reacting or mixing with the first solution layer.

17. A method of manufacturing a light-propagating probe for a near-field microscope according to claim 16; wherein the etching fluid comprising a first solution layer and a second solution layer, and the light-propagating body, are arranged on a vibration isolation table, and the etching solution is temperature-controlled to a fixed temperature.

18. A method of manufacturing a light-propagating probe for a near-field microscope according to claim 16; wherein the step of sharpening the light-propagating body includes a step of washing the light-propagating body using an organic solvent that dissolves the material constituting the second solution layer, and is water soluble.

19. A method of manufacturing a light-propagating probe for a near-field microscope according to claim 1; wherein the step of sharpening the light-propagating body includes a step of testing for presence or absence of cylindrical cavity defects in at least a part of the light-propagating body that is to be sharpened.

20. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
- a step of sharpening the light-propagating body;
- a step of forming the light-propagating body in a hook-shape;
- a step of forming the reflecting surface;
- a metal film coating step for forming the transparent opening;
- a step of protecting the transparent opening with a resist material;
- a metal film coating step for coating at least the reflecting surface;
- a step of removing the resist material; and
- a step of testing for presence or absence of cavity defects by arranging the light-propagating body between two light transparent glass plates, filling the space between the two glass plates with a transparent fluid medium having the same refractive index as the refractive index of the light-propagating body, and then observing the light-propagating body using an optical microscope.

21. A method of manufacturing a light-propagating probe for a near-field microscope according to claim 20; wherein the observation of the light-propagating body using the optical microscope in the step of testing for the cavity defects is carried out using dark field observation.

22. A method of manufacturing a light-propagating probe for a near-field microscope according to claim 1; wherein the step of forming the light-propagating body in a hook shape is carried out by irradiating carbon dioxide gas laser light to a desired position close to the tip section of the sharpened light-propagating body.

23. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
- a step of sharpening the light-propagating body;
- a step of forming the light-propagating body in a hook-shape;
- a step of forming the reflecting surface;
- a metal film coating step for forming the transparent opening;
- a step of protecting the transparent opening with a resist material;
- a metal film coating step for coating at least the reflecting surface; and
- a step of removing the resist material,
- wherein the step of forming the light-propagating body in a hook shape is carried out by irradiating carbon dioxide gas laser light to a desired position close to the tip section of the sharpened light-propagating body and determining the bend angle of the hook shape through simultaneous observation using a camera, to control irradiation of the carbon dioxide gas laser light.

24. A method of manufacturing a light-propagating probe for a near-field microscope according to claim 1; wherein the step of forming the reflecting surface comprises mechanically polishing the hook-shaped section of the light-propagating body sharpened and formed in a hook shape by pressing the hook-shaped section against a rotating polishing plate utilizing the resilience of the light-propagating body itself.

25. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
- a step of sharpening the light-propagating body;
- a step of forming the light-propagating body in a hook-shape;
- a step of forming the reflecting surface;
- a metal film coating step for forming the transparent opening;
- a step of protecting the transparent opening with a resist material;
- a metal film coating step for coating at least the reflecting surface; and
- a step of removing the resist material,
- wherein the step of forming the reflecting surface comprises mechanically polishing the hook-shaped section of the light-propagating body sharpened and formed in a hook shape by pressing the hook-shaped section against a rotating polishing plate utilizing the resilience of the light-propagating body itself; and the step of mechanically polishing the light-propagating body is carried out by causing the light-propagating body to project a specified length and fixing same to a polishing stage at a first angle with respect to a surface of the polishing plate, bringing the polishing stage and the polishing plate relatively close to each other, causing a part of the light-propagating body to be polished into contact with the polishing plate, bringing the polishing stage and the polishing plate closer together relatively, and holding the part of the light-propagating body to be polished at a second angle with respect to the surface of the polishing plate.

26. A method of manufacturing a light-propagating probe for a near-field microscope according to claim 25; wherein the specified length is in the range 5 mm to 50 mm, the first angle is in a range of 2 degrees to 60 degrees, and the second angle is 0 degrees or more, and less than the first angle.

27. A method of manufacturing a light-propagating probe for a near-field microscope according to claim 5; wherein the wet chemical etching is carried out after tension fracture of the light-propagating body by irradiation of carbon dioxide gas laser light, before the step of making the light-propagating body hook-shaped.

28. A method of manufacturing a light-propagating probe for a near-field microscope according to claim 5; wherein the wet chemical etching is carried out after tension fracture of the light-propagating body by irradiation of carbon dioxide gas laser light, and the step of making the light-propagating body hook-shaped.

29. A method of manufacturing a light-propagating probe for a near-field microscope according to claim 1; wherein the metal film coating step for forming the transparent opening is a vacuum deposition step using a rotating deposition jig to carry out deposition while rotating the light-propagating body, the rotating deposition jig having a structure where the light-propagating body is held so that the jig rotational axis becomes the same as or parallel to the center axis of the tip section of the light-propagating body that has been sharpened and formed into a hook shape.

30. A method of manufacturing a light-propagating probe for a near-field microscope according to claim 1; wherein the metal film coating step for forming the transparent opening is a step of depositing the metal film coating to a desired film thickness in at least two stages, including a procedure of carrying out deposition a first time, opening a vacuum chamber to the atmosphere, and carrying out deposition a second time.

31. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
  a step of sharpening the light-propagating body;
  a step of forming the light-propagating body in a hook-shape;
  a step of forming the reflecting surface;
  a metal film coating step for forming the transparent opening;
  a step of protecting the transparent opening with a resist material;
  a metal film coating step for coating at least the reflecting surface; and
  a step of removing the resist material,
  wherein the metal film coating step for forming the transparent opening is a step of depositing the metal film coating to a desired film thickness in at least two stages, including a procedure of carrying out deposition a first time, stopping exhaust of a vacuum, injecting oxygen gas until a desired pressure is reached, exhausting the vacuum again and carrying out deposition a second time.

32. A method of manufacturing a light-propagating probe for a near-field microscope according to claim 1; wherein the metal film coating step for coating the reflecting surface is a vacuum deposition step using a rotating deposition jig to carry out deposition while rotating the light-propagating body, the rotating deposition jig having a structure where the light-propagating body is held so that the jig rotational axis becomes the same as or parallel to the center axis of the spring operating part rearward from the hook-shaped section.

33. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
  a step of sharpening the light-propagating body;
  a step of forming the light-propagating body in a hook-shape;
  a step of forming the reflecting surface;
  a metal film coating step for forming the transparent opening;
  a step of protecting the transparent opening with a resist material;
  a metal film coating step for coating at least the reflecting surface; and
  a step of removing the resist material,
  wherein the metal film coating step for coating at least the reflecting surface is a step of forming a metal film by vacuum deposition or sputtering from at least two directions around the center axis of the spring operating part, a light-propagating body fixing jig for film formation being rotatable around the center axis of a straight part of the light-propagating body rearward of the hook-shaped section.

34. A method of manufacturing a light-propagating probe for a near-field microscope according to claim 1; wherein the metal film coating is any of aluminum, aluminum silicon alloy, gold or silver.

35. A method of manufacturing a light-propagating probe for a near-field microscope according to claim 1; wherein the metal film coating is a two layer construction of any of silver/gold, chrome/gold, aluminum/gold, aluminum silicon alloy/gold.

36. A method of manufacturing a light-propagating probe for a near-field microscope according to claim 34; wherein the aluminum silicon alloy has a silicon component in a weight ratio of 0.5% to 2%.

37. A method of manufacturing a light-propagating probe for a near-field microscope according to claim 1; wherein the film thickness of the metal film coating for forming the transparent opening is from 30 mm to 1,000 nm.

38. A method of manufacturing a light-propagating probe for a near-field microscope according to claim 29; wherein the vacuum deposition step has a film formation rate of 5 nm per second or faster.

39. A method of manufacturing a light-propagating probe for a near-field microscope according to claim 29; wherein the vacuum deposition step has a film formation rate in a range of 10 nm to 100 nm per second.

40. A method of manufacturing a light-propagating probe for a near-field microscope according to claim 29; wherein the vacuum deposition step has a rotation rate for the rotating deposition jig in a range from 30 times per second to 1,000 times per second.

41. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
- a step of sharpening the light-propagating body;
- a step of forming the light-propagating body in a hook-shape;
- a step of forming the reflecting surface;
- a metal film coating step for forming the transparent opening;
- a step of protecting the transparent opening with a resist material;
- a metal film coating step for coating at least the reflecting surface; and
- a step of removing the resist material,
- wherein the step of protecting the transparent opening with a resist material includes dripping the resist material onto a flat plate, and inserting the transparent opening from 5 µm to 200 µm into a section of the resist material that is raised up by its own surface tension using a precision stage.

42. A method of manufacturing a light-propagating probe for a near-field microscope, the light-propagating probe having a light-propagating body that terminates at one end in a hook-shaped section that has a sharpened tip section at a free end thereof, the tip section being coated with a metal film coating except at the tip end thereof to form a transparent opening at the tip end for passing light, a portion of the light-propagating body that extends rearward of the hook-shaped section constituting a spring operating part for functioning as a cantilever capable of being displaced in a direction perpendicular to a sample surface, and the light-propagating body having a reflecting surface for carrying out optical position detection of the tip section, the method comprising:
- a step of sharpening the light-propagating body;
- a step of forming the light-propagating body in a hook-shape;
- a step of forming the reflecting surface;
- a metal film coating step for forming the transparent opening;
- a step of protecting the transparent opening with a resist material;
- a metal film coating step for coating at least the reflecting surface; and
- a step of removing the resist material,
- wherein the step of protecting the transparent opening with a resist material includes inserting the transparent opening in a resist material and determining the insertion amount while performing observation using a microscope.

43. A method of manufacturing a light-propagating probe for a near-field microscope according to claim 41; wherein the resist material is a resin material mainly composed of any of butyl acetate, ethyl acetate, or nitrocellulose.

44. A method of manufacturing a light-propagating probe for a near-field microscope according to claim 1; wherein the step for removing the resist material includes a procedure for ultrasonic cleaning using a cleaning solvent mainly composed of N-methyl-2-pyrrolidone.

45. A method of manufacturing a light-propagating probe for a near-field microscope according to claim 1; further including removing trace amounts of foreign matter that have become attached to the light-propagating body surface by ultrasonic cleaning using a cleaning solvent mainly composed of N-methyl-2-pyrrolidone, executed before any or all of the step of sharpening the light-propagating probe body, the step of forming the light-propagating probe body in a hook shape, the step of forming the reflecting surface, the metal film coating step for forming the transparent opening, the step of protecting the transparent opening with a resist material, the metal film coating step for coating at least the reflecting surface, and the step of removing the resist material.

46. A method of manufacturing a light-propagating probe for a near-field microscope according to claim 1; wherein during the step of sharpening the light-propagating probe body, the step of forming the light-propagating probe body in a hook shape, the step of forming the reflecting surface, the metal film coating step for forming the transparent opening, the step of protecting the transparent opening with a resist material, the metal film coating step for coating at least the reflecting surface, and the step of removing the resist material, handling of the light-propagating body is carried out in an environment having antistatic means for reducing buildup of static electricity.

47. A method of manufacturing a light-propagating probe for a near-field microscope according to claim 46; wherein the antistatic means comprises any one of an ionizer, an antistatic sheet, a metal case for light-propagating body storage, or humidity control.

48. A method of manufacturing a light-propagating probe for a near-field scanning probe apparatus, comprising:
- providing an elongate, solid light-propagating body having a resilient spring section which functions as a cantilever during use of the light-propagating probe;
- forming a pointed tip section at an end section of the light-propagating body;
- transforming the end section of the light-propagating body into a hook-shaped section that has the pointed tip section at a free end thereof and that has the other end thereof connected to the resilient spring section;
- coating the pointed tip section of the hook-shaped section with a metal film coating to form a transparent opening that is free of the metal film coating at the tip end of the pointed tip section;
- applying a resist material over the transparent opening;
- forming a reflecting surface on the light-propagating body for use in optically detecting the position of the pointed tip section during use of the light-propagating probe;
- coating the remainder of the hook-shaped section, including the reflecting surface, with a metal film coating; and
- thereafter removing the resist material from the transparent opening.

49. A method according to claim 48; wherein the forming of a pointed tip section is carried out by applying spring tension to the light-propagating body while locally heating the tensioned light-propagating body to cause tension fracture thereof.

50. A method according to claim 48; wherein the coating of the pointed tip section of the hook-shaped section with a metal film coating to form a transparent opening is carried out in two, separate metal-film deposition stages.

51. A method according to claim 48; wherein the coating of the remainder of the hook-shaped section with a metal film coating is carried out by vacuum deposition or sputtering from at least two directions around the center axis of the resilient spring section.

52. A method according to claim 48; wherein the applying of a resist material over the transparent opening comprises inserting the tip end of the pointed tip section having the transparent opening into the resist material and determining the amount of insertion of the tip end into the resist material through observation using a microscope.

* * * * *